(12) United States Patent
Bienkowski et al.

(10) Patent No.: US 9,075,916 B1
(45) Date of Patent: Jul. 7, 2015

(54) UNDOING/REDOING PROGRAM CODE EXECUTION

(71) Applicant: The MathWorks, Inc., Natick, MA (US)

(72) Inventors: Joseph R. Bienkowski, Ashland, MA (US); Roy E. Lurie, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/086,246

(22) Filed: Nov. 21, 2013

Related U.S. Application Data

(63) Continuation-in-part of application No. 14/059,872, filed on Oct. 22, 2013.

(51) Int. Cl.
G06F 9/44 (2006.01)
G06F 11/36 (2006.01)

(52) U.S. Cl.
CPC .................................. *G06F 11/3664* (2013.01)

(58) Field of Classification Search
USPC ................... 717/123–131, 140–141; 715/700
IPC ................. G06F 11/30,11/3668, 11/36, 11/362, G06F 11/3664
See application file for complete search history.

(56) References Cited

U.S. PATENT DOCUMENTS

| | | | | |
|---|---|---|---|---|
| 5,317,740 A * | 5/1994 | Sites | ............................. | 717/129 |
| 5,339,428 A * | 8/1994 | Burmeister et al. | .......... | 717/146 |
| 6,263,489 B1 * | 7/2001 | Olsen et al. | ................... | 717/129 |
| 6,282,701 B1 * | 8/2001 | Wygodny et al. | ............. | 717/125 |
| 6,915,509 B1 * | 7/2005 | Chkodrov et al. | ............ | 717/124 |
| 6,988,264 B2 * | 1/2006 | Sarma et al. | ................... | 717/128 |
| 7,020,852 B2 * | 3/2006 | Oeltjen et al. | ................. | 716/136 |
| 7,058,928 B2 * | 6/2006 | Wygodny et al. | ............. | 717/128 |
| 7,146,613 B2 * | 12/2006 | Chauvel et al. | .................... | 718/1 |
| 7,171,655 B2 * | 1/2007 | Gordon et al. | ................ | 717/146 |
| 7,475,385 B2 * | 1/2009 | Huemiller, Jr. | ................ | 717/127 |
| 7,685,570 B2 * | 3/2010 | Draine et al. | ................. | 717/125 |
| 7,823,135 B2 * | 10/2010 | Horning et al. | ................ | 717/127 |
| 7,917,894 B2 * | 3/2011 | Chen et al. | ..................... | 717/124 |
| 8,079,019 B2 * | 12/2011 | Lindo et al. | ..................... | 717/129 |
| 8,104,021 B2 * | 1/2012 | Erlingsson et al. | ........... | 717/126 |
| 8,146,058 B2 * | 3/2012 | Sarkar et al. | ................... | 717/124 |
| 8,312,435 B2 * | 11/2012 | Wygodny et al. | ............. | 717/130 |
| 8,392,885 B2 * | 3/2013 | Stall et al. | ..................... | 717/124 |

(Continued)

OTHER PUBLICATIONS

Fontana et al, "Impact of Refactoring on Quality Code Evaluation", ACM, pp. 37-40, 2011 W DiGiuseppe, "Automatically Describing Software Faults", ACM, pp. 711-714, 2013.*

(Continued)

*Primary Examiner* — Anil Khatri
(74) *Attorney, Agent, or Firm* — Harrity & Harrity, LLP

(57) ABSTRACT

A device may obtain first program code, and may cause the first program code to be executed. The device may determine a first execution state generated based on causing the first program code to be executed. The device may store the first execution state. The device may obtain second program code that includes a modification to the first program code, and may cause the second program code to be executed. The device may determine a second execution state generated based on causing the second program code to be executed. The device may store the second execution state. The device may receive an indication to restore the first execution state, and may restore the first execution state based on receiving the indication.

20 Claims, 23 Drawing Sheets

(56) References Cited

U.S. PATENT DOCUMENTS

| | | | | |
|---|---|---|---|---|
| 8,656,351 | B2 * | 2/2014 | Kodosky et al. | 717/109 |
| 8,799,871 | B2 * | 8/2014 | Baker | 717/130 |
| 8,832,663 | B2 * | 9/2014 | Krauss | 717/127 |
| 8,863,085 | B1 * | 10/2014 | Stahlberg | 717/124 |

OTHER PUBLICATIONS

Fontana et al, "Investigating the Impact of Code Smells Debt on Quality Code Evaluation" IEEE, pp. 15-22, 2012.*

DiGiuseppe, "Automatically Describing Software Faults", ACM, pp. 711-714, 2013.*

Ficco et al, "Bug Localization in Test-Driven Development", Hindawi Publishing Corporation, Advances in Software Engineering, vol. 2011, Article ID 492757, pp. 1-18, 2011.*

Co-pending U.S. Appl. No. 14/059,872, filed Oct. 22, 2013 entitled "A Program Code Interface for Providing Program Code and Corresponding Results of Evaluating the Program Code", Bienkowski et al., 120 pages.

* cited by examiner

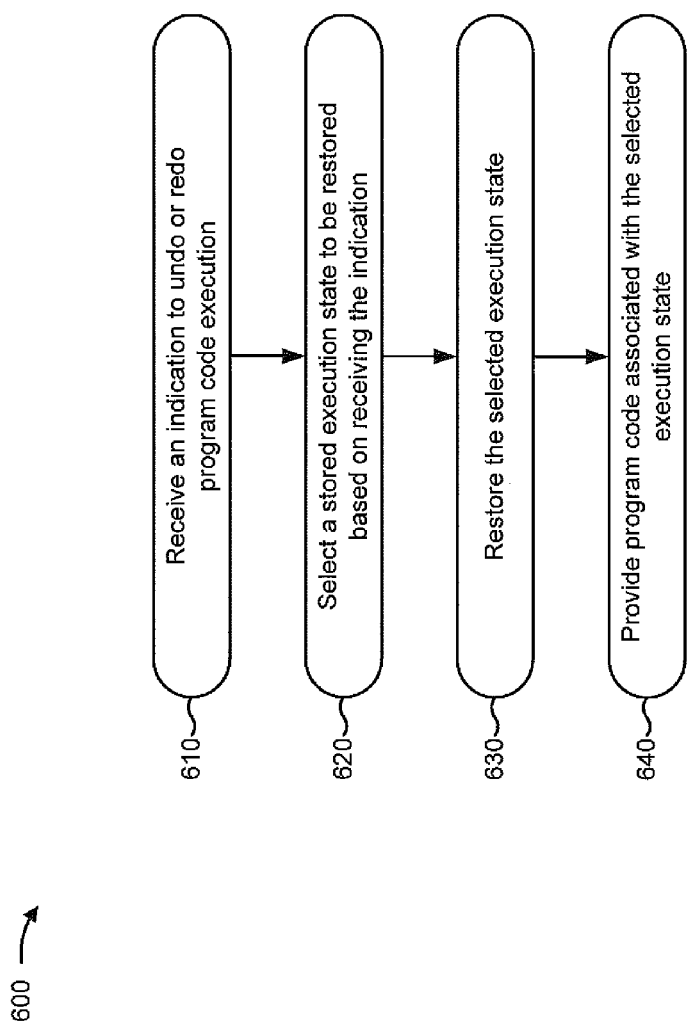

UNDOING/REDOING PROGRAM CODE EXECUTION

RELATED APPLICATION

This application is a continuation-in-part (CIP) of U.S. patent application Ser. No. 14/059,872, filed on Oct. 22, 2013, the content of which is incorporated by reference herein in its entirety.

BRIEF DESCRIPTION OF THE DRAWINGS

FIG. 6 is a flow chart of an example process for undoing or redoing program code execution;

DETAILED DESCRIPTION

The following detailed description of example implementations refers to the accompanying drawings. The same reference numbers in different drawings may identify the same or similar elements.

In a programming environment, execution of program code may result in changes to information stored as a result of executing the code. In some cases, such changes may be significant, and a programmer may have difficulty recovering previously stored information (e.g., which may be modified or deleted by a later execution). This may result in a loss of important information. This is particularly true in a live evaluation environment, where program code is evaluated as a programmer is inputting the program code. Implementations described herein allow a programmer to more easily recover information stored as a result of a previous execution of program code. These implementations may, for example, permit a programmer to undo or redo a program code execution.

Figure 1A:
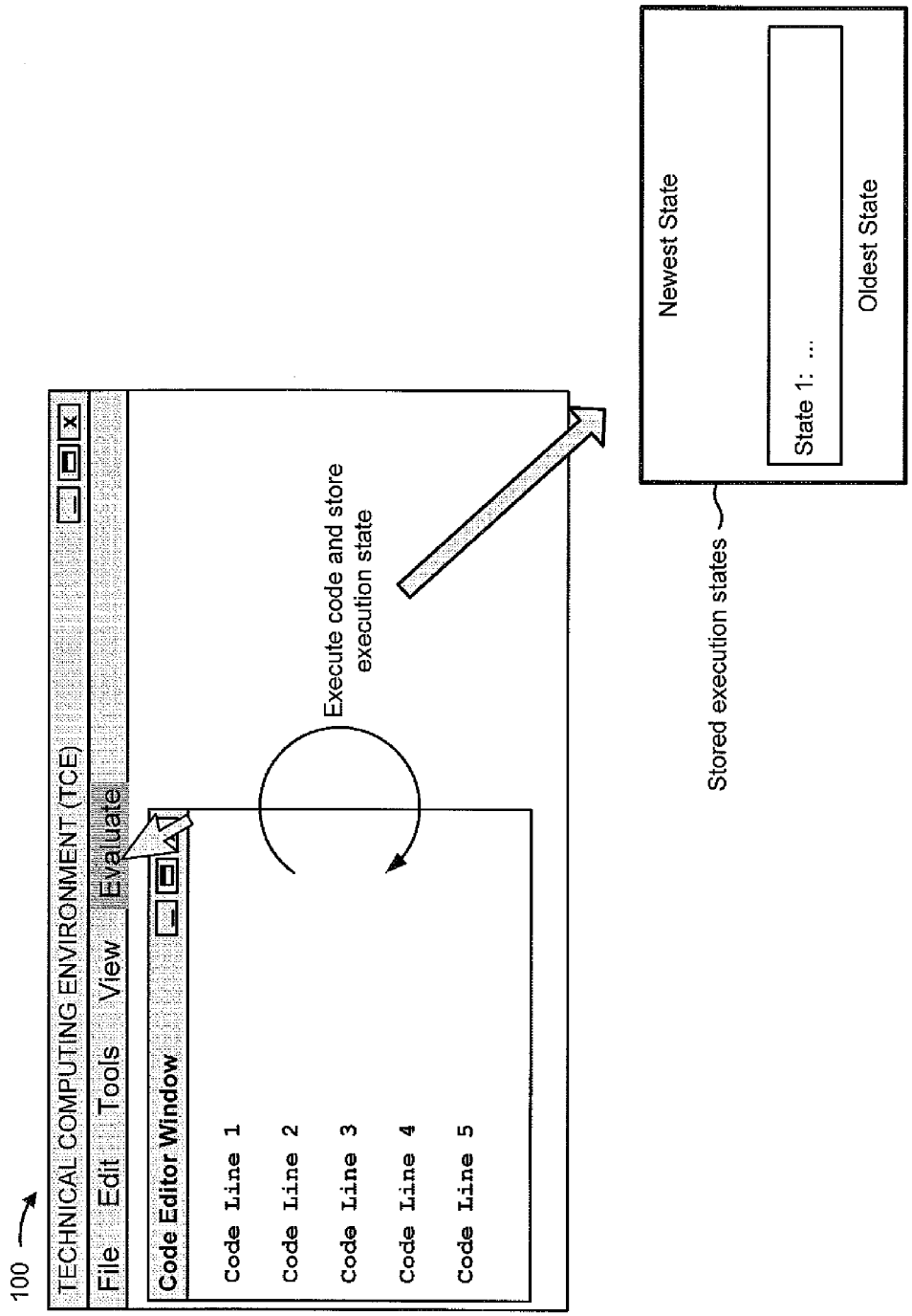
FIGS. 1A-1D are diagrams of an overview of an example implementation described herein.

FIGS. 1A-1D are diagrams of an overview of an example implementation 100 described herein. As shown in FIG. 1A, a user (e.g., a computer programmer) may input program code via a code editor window of a technical computing environment (TCE) executing on a client device. For example, in FIG. 1A, the program code is shown as code lines one through five. The user may interact with a user interface of the TCE to cause the client device to execute the program code and store an execution state based on executing the program code. For example, the client device may store the execution state in memory, shown as State 1.

The execution state may include information generated based on executing the program code. For example, the execution state may include information associated with a variable (e.g., a variable value, a data type, etc.) in the program code, a figure (e.g., an image, a graph, a plot, a table, etc.) associated with the program code, a file system state (e.g., an indication of a file that has been created, edited, deleted, etc.) impacted by executing the program code, a workspace that includes the program code, a program code evaluation result, etc. A program code evaluation result may include, for example, a result of executing the program code, an error generated based on attempting to execute the program code, help information generated based on evaluating the program code, etc.

Figure 1B:
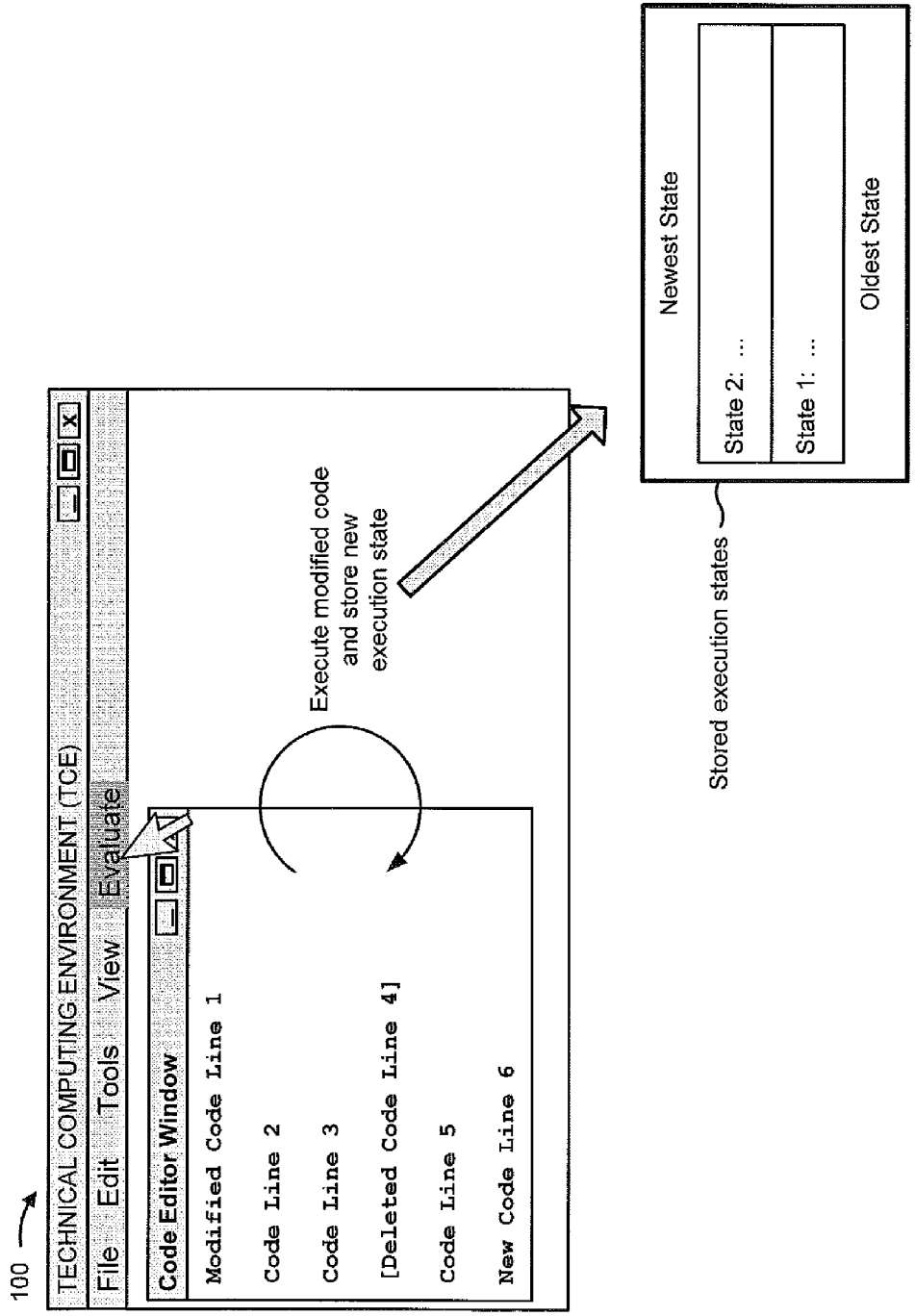

As shown in FIG. 1B, assume that the user modifies the program code via the code editor window. For example, the user may modify the first line of code, shown as "Modified Code Line 1," may delete the fourth line of code, and may add a new line of code, shown as "New Code Line 6." The user may interact with the user interface to cause the client device to execute the modified program code and store a new execution state based on executing the modified program code. For example, the client device may store the new execution state in memory, shown as State 2. The client device may also store an indication of a temporal order associated with the execution states, indicating that State 2 is newer than State 1 (e.g., was generated more recently than State 1).

Figure 1C:
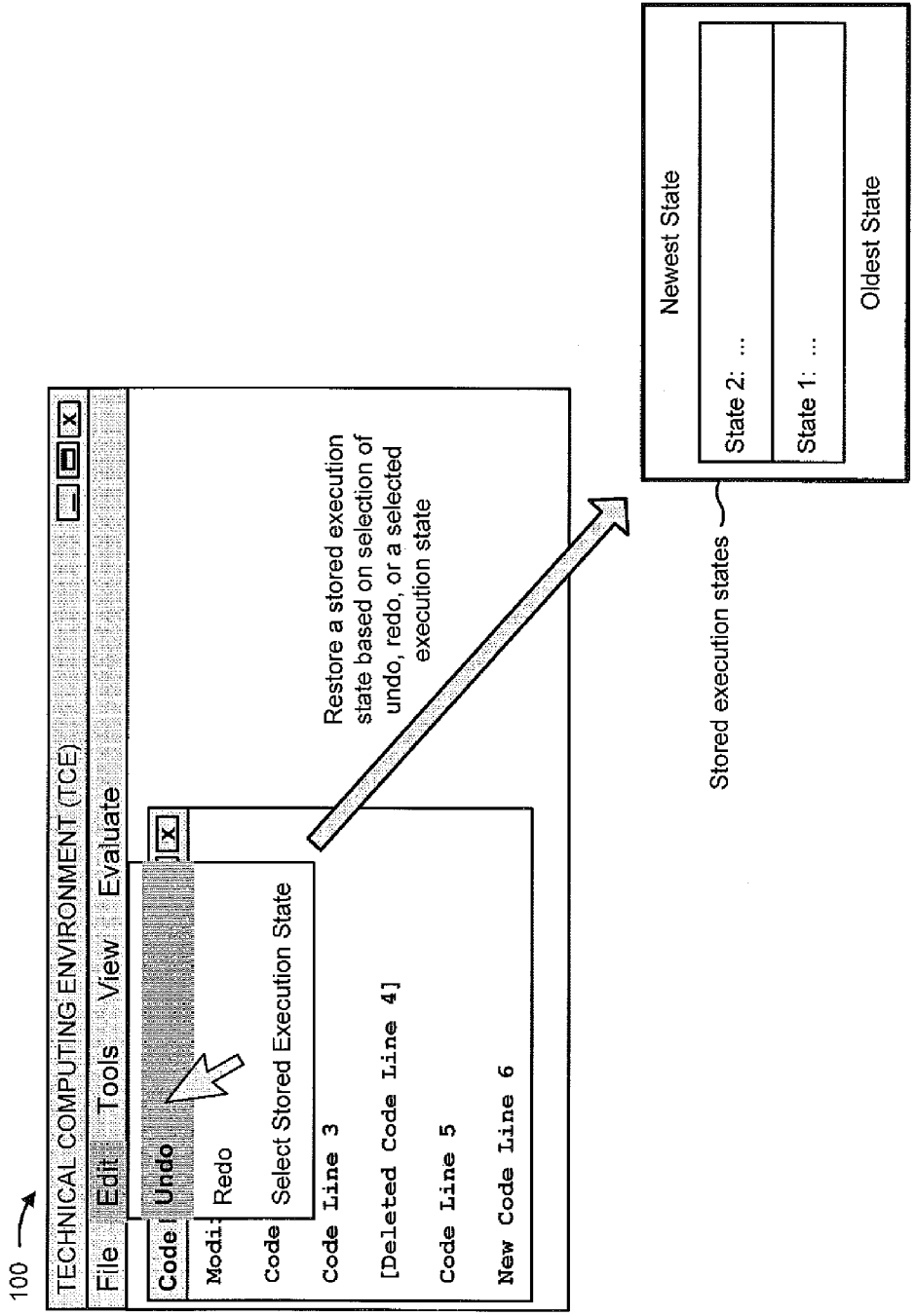

As shown in FIG. 1C, the user may wish to undo the changes resulting from executing the modified program code, and to return the execution state to State 1. The user may interact with the user interface to cause the client device to restore a stored execution state (e.g., State 1). In some implementations, the user may also redo an execution (e.g., may restore State 2 after restoring State 1), or may select a stored execution state (e.g., State 1 or State 2) to be restored.

Figure 1D:
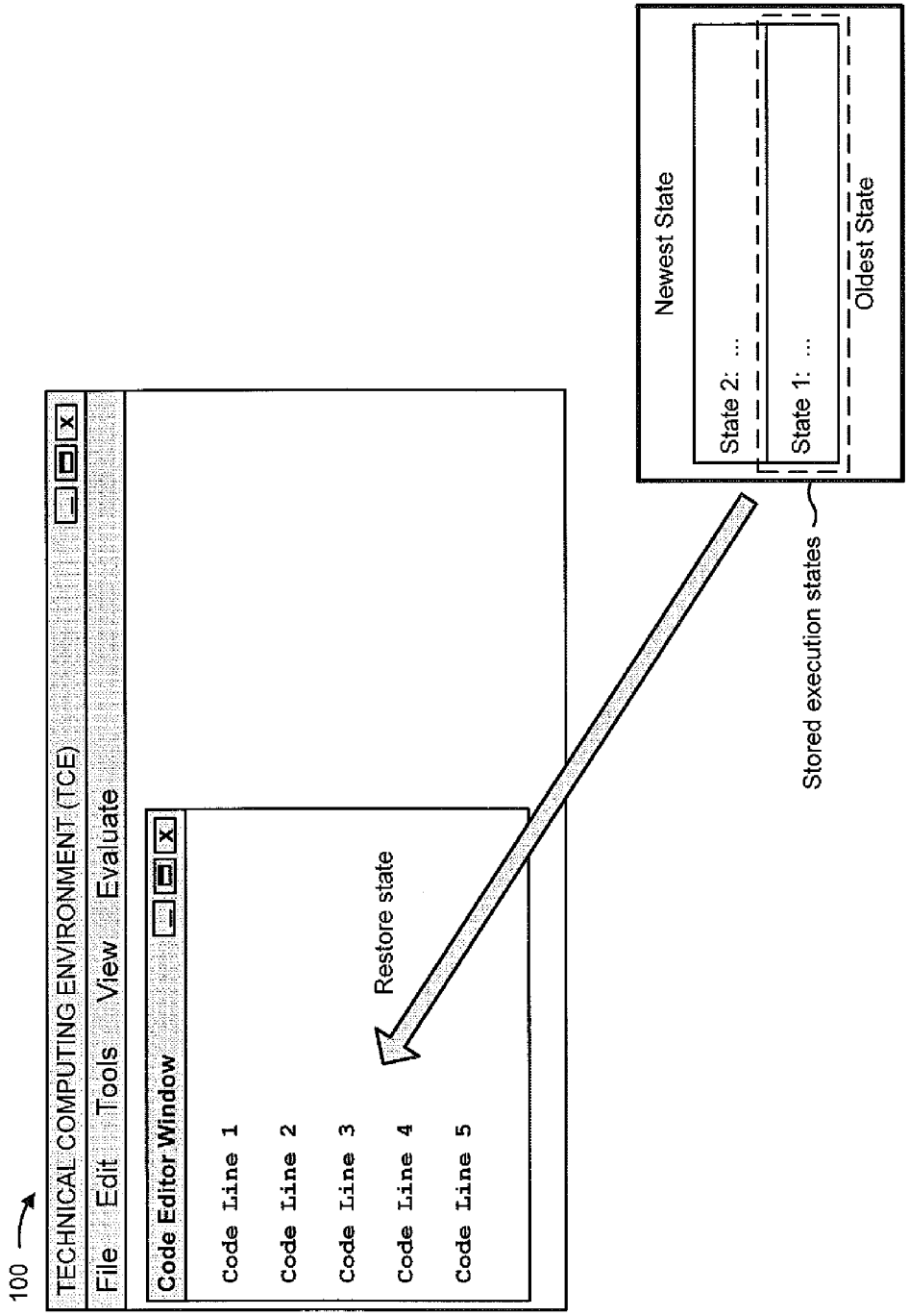

As shown in FIG. 1D, based on the user selecting to undo the execution, the client device restores State 1 by, for example, restoring variable values, workspace values, figures, program code execution results, etc. associated with execution of the unmodified program code (e.g., shown in FIG. 1A). As further shown, the client device may provide the unmodified program code via the code editor window (e.g., may restore the program code to the previous version). In this way, a user may easily fix mistakes, undo an execution that generates unwanted results, or view differences between execution states by undoing an execution, redoing an execution, or selecting an execution state to be restored.

Figure 2:
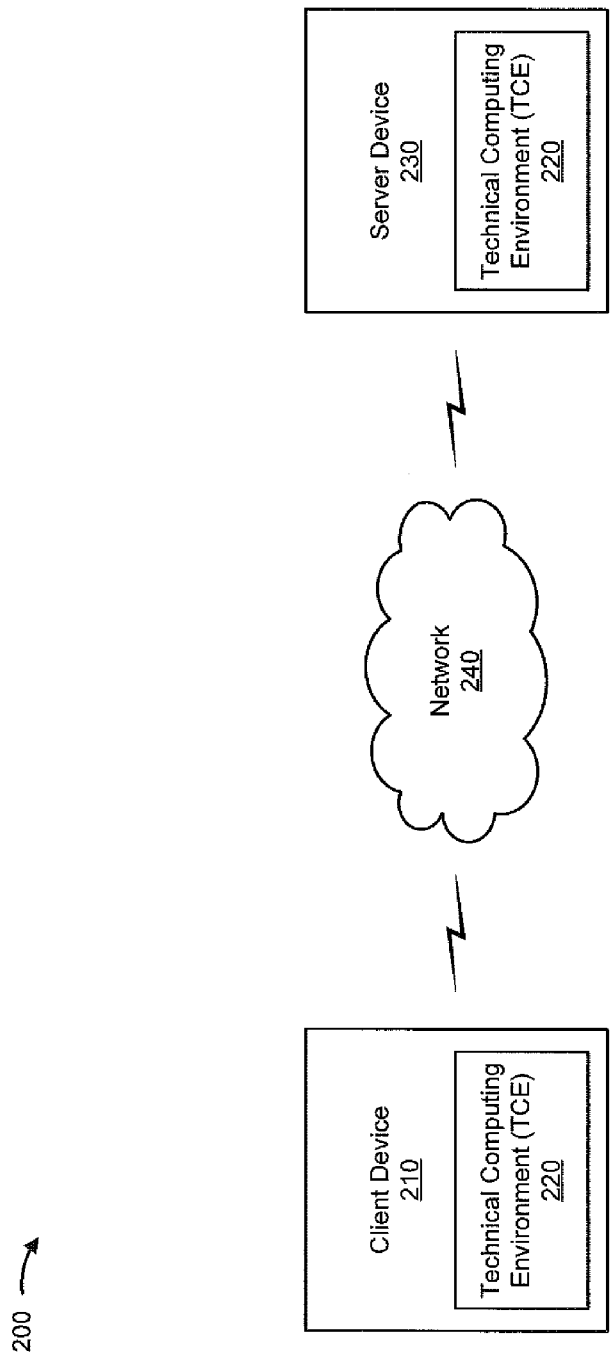
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., an execution state, a result of evaluating program code, etc.). For example, client device 210 may include a computing device, such as a desktop computer, a laptop computer, a tablet computer, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), etc. In some implementations, client device 210 may receive information from and/or or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. In some implementations, TCE 220 may include a command line interface.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
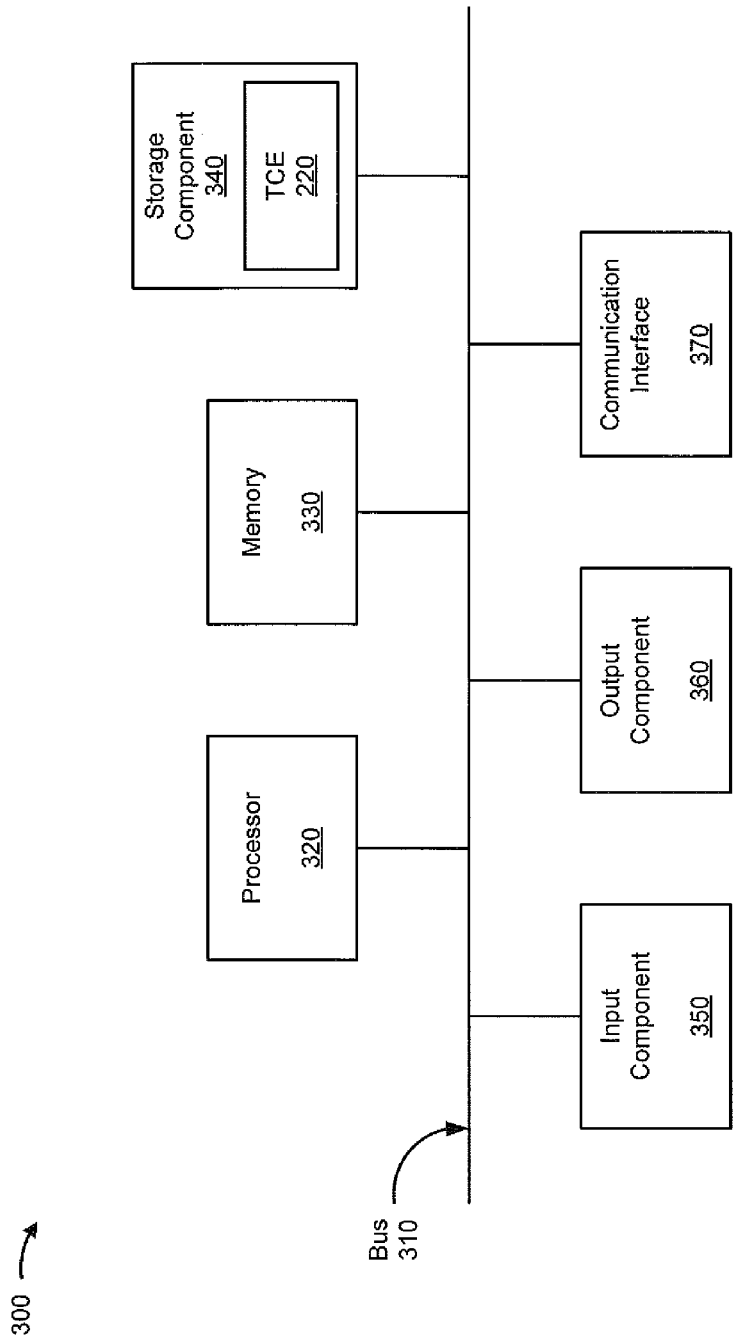
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
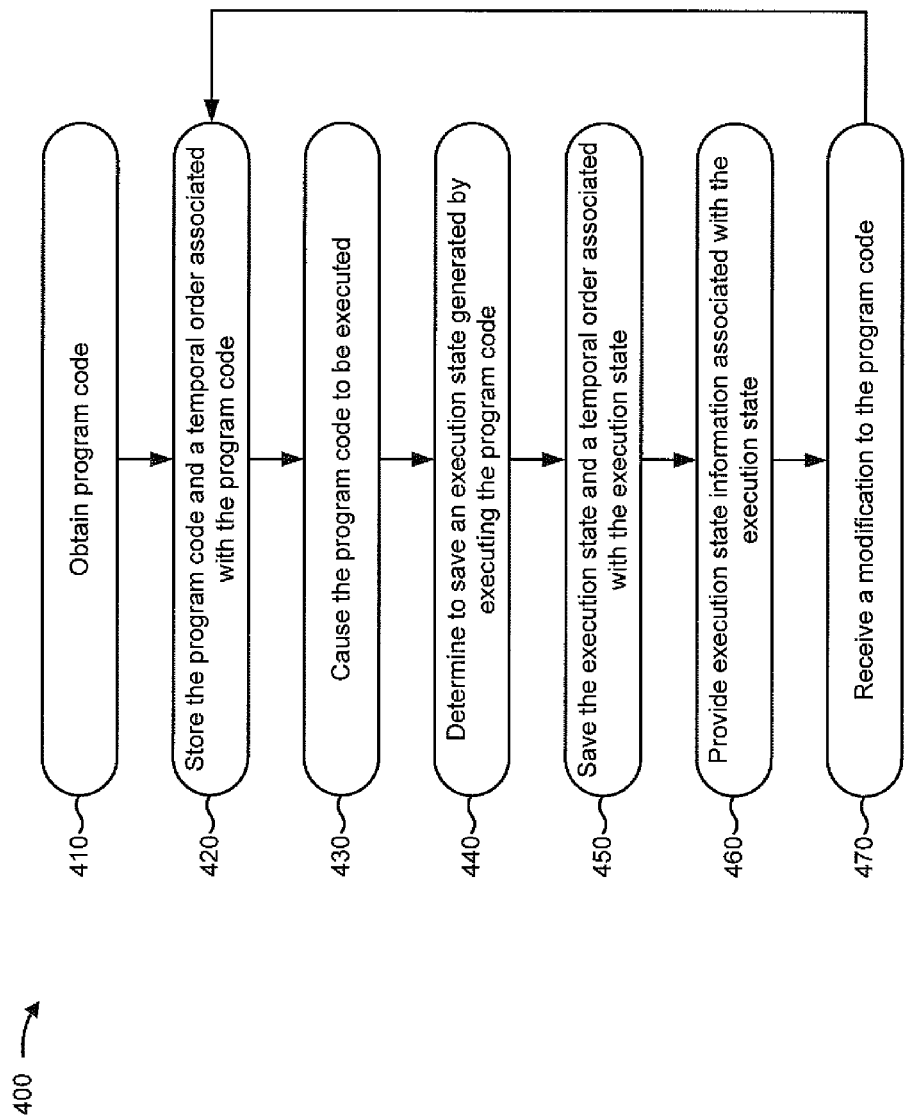
FIG. 4 is a flow chart of an example process for storing execution states associated with program code execution so that program code execution can be undone or redone.

FIG. 4 is a flow chart of an example process 400 for storing execution states associated with program code execution so that program code execution can be undone or redone. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include obtaining program code (block 410). For example, client device 210 may obtain program code. In some implementations, a user may input information identifying the program code or a memory location at which the program code is stored (e.g., local to and/or remote from client device 210). Based on the user input, client device 210 may retrieve the program code. Additionally, or alternatively, client device 210 may provide a user interface (e.g., via TCE 220) via which a user may input program code, and client device 210 may obtain the input program code via the user interface.

As further shown in FIG. 4, process 400 may include storing the program code and a temporal order associated with the program code (block 420). For example, a user may input program code, and client device 210 may store the program code in memory. Additionally, or alternatively, client device 210 may store a temporal order associated with the program code. The temporal order may indicate a time relationship between the program code and other program code. For example, the temporal order may indicate that first program code was obtained, input, and/or stored before second program code was obtained, input, and/or stored. As another example, the temporal order may indicate that first program code was obtained, input, and/or stored after second program code was obtained, input, and/or stored.

In some implementations, information that identifies the program code and/or the temporal order may be stored locally on client device 210. Additionally, or alternatively, information that identifies the program code and/or the temporal order may be stored remote from client device 210, such as by storing the information on server device 230. For example, client device 210 may transmit the information to server device 230 for storage.

As further shown in FIG. 4, process 400 may include causing the program code to be executed (block 430). For example, client device 210 may cause the program code to be executed. In some implementations, client device 210 may execute the program code. Additionally, or alternatively, client device 210 may provide the program code to server device 230 for execution. Server device 230 may execute the program code, and may provide a result of executing the program code to client device 210.

Client device 210 may generate a program code evaluation result based on causing the program code to be executed. The program code evaluation result may include a result of executing the program code, may identify one or more errors associated with the program code (e.g., based on one or more portions of program code that failed to execute), may include help information associated with the program code, etc.

As further shown in FIG. 4, process 400 may include determining to save an execution state generated based on executing the program code (block 440), and saving the execution state and a temporal order associated with the execution state (block 450). For example, client device 210 may determine to save the execution state when a condition is satisfied, may determine that the condition is satisfied, and may save the execution state based on determining that the condition is satisfied.

Client device 210 may save the execution state based on evaluating and/or executing the program code (e.g., when program code evaluation results are generated). For example, a user may provide input indicating that the program code is to be executed, and client device 210 may execute the program code based on the input, and may save the execution state based on the execution. As another example, client device 210 may execute program code as the user inputs the program code, and may save the execution state based on the execution. In some implementations, client device 210 may save the execution state based on an error-free execution of the program code (e.g., based on determining that the program code does not include errors).

Client device 210 may save the execution state by causing the execution state to be stored (e.g., locally on client device 210 and/or remotely on server device 230). The execution state may include information generated based on executing the program code. For example, the execution state may include information associated with a variable (e.g., a variable value, a data type, a random number seed, etc.) in the program code, a figure (e.g., an image, a graph, a plot, a table, etc.) associated with the program code, a file system state (e.g., an indication of a file that has been created, edited, deleted, etc.) impacted by executing the program code, information stored in a data structure, a workspace that includes the program code, a program code evaluation result, etc. In some implementations, client device 210 may store information that identifies one or more operations performed by the execution (e.g., storing a variable value, loading an image, plotting a value on a figure, creating a figure, modifying a file system, modifying information stored in a data structure, generating a result, etc.).

Additionally, or alternatively, client device 210 may save a temporal order associated with the execution state. The temporal order may indicate a time relationship between the execution state and another execution state. For example, the temporal order may indicate that a first execution state was generated and/or stored before a second execution state was generated and/or stored. As another example, the temporal order may indicate that a first execution state was generated and/or stored after a second execution state was generated and/or stored. In some implementations, the execution states may be stored in a stack, with a position in the stack indicating the temporal order of the execution states. For example, a new execution state may be pushed to the top of the stack. By storing the execution states and a temporal order associated with the execution states, client device 210 may permit a user to easily undo or redo program code execution.

The execution states and program code associated with each execution state may be stored in a common data structure (e.g., the same stack), or different data structures (e.g., different stacks). For example, a first stack may store information that identifies an order of execution states, and a second stack may store information that identifies program code. Client device 210 may store information, in the first stack and/or the second stack, that identifies a corresponding item in the other stack. For example, client device 210 may store information in the execution state stack that identifies corresponding program code stored in the program code stack.

In some implementations, the execution state and/or the temporal order may be stored locally on client device 210. Additionally, or alternatively, the execution state and/or the temporal order may be stored remote from client device 210, such as by storing the information on server device 230. For example, client device 210 may transmit the information to server device 230 for storage.

As further shown in FIG. 4, process 400 may include providing execution state information (block 460). For example, client device 210 may provide, via the user interface, execution state information. The execution state information may include information that identifies an execution state (e.g., a name, such as State 1, State 2, etc.), a date and/or time associated with the execution state (e.g., a date and/or time at which the execution state was generated, stored, etc.), program code used to generate the execution state, one or more results included in the execution state (e.g., results generated by executing the code), a temporal order associated with a set of execution states (e.g., a relative order in which multiple execution state were generated, stored, etc.), etc.

As an example, client device 210 may provide a pop-up window that displays a representation of an execution state stack. Execution states may appear in the stack in a temporal order with which the execution states were generated and/or stored. Additionally, or alternatively, client device 210 may provide an input mechanism for a user to remove an execution state from the stack. In some implementations, removing an execution state from the stack may cause the execution state to be deleted from memory.

Additionally, or alternatively, client device 210 may provide an input mechanism for a user to view additional execution state information than the execution state information initially provided for display. For example, client device 210 may display a state name for an execution state, and the user may select the execution state (e.g., by clicking on, hovering over, etc. the name). Based on this interaction, client device 210 may provide additional information associated with the selected execution state, such as results included in the execution state, program code associated with the execution state, etc. In some implementations, client device 210 may provide an input mechanism that permits the user to modify a temporal order associated with a set of execution states.

As further shown in FIG. 4, process 400 may include receiving a modification to the program code (block 470). For example, client device 210 may receive user input that modifies the program code. The modification may include adding new program code, deleting existing program code, editing existing program code, etc. The modified program code may generate a different execution state when executed.

As further shown in FIG. 4, process 400 may include returning to block 420 to perform one or more steps of process 400 on the modified program code. For example, client device 210 may store the modified program code and a temporal order associated with the modified program code (e.g., indicating that the modified program code was input after the unmodified program code), may cause the modified program code to be executed, may determine to save a new execution state associated with the modified program code, may save the new execution state and a temporal order associated with the new execution state (e.g., indicating that the new execution state was generated after the original execution state), and may provide execution state information associated with the new execution state.

In some implementations, client device 210 may save the entire new execution state. Additionally, or alternatively, client device 210 may determine the differences between the new execution state and the original execution state, and may store information that identifies the differences. In this way, client device 210 may store information that permits a user to switch between the new execution state and the original execution state (e.g., by undoing execution of the modified program code, by redoing execution of the modified program code, by selecting the modified program code for restoration, by selecting the unmodified program code for restoration, etc.). Furthermore, saving execution states in this manner saves time when restoring the results, as the program code does not need to be executed again.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E depict an example where client device 210 stores multiple execution states based on execution of different sets of program code.

Figure 5A:
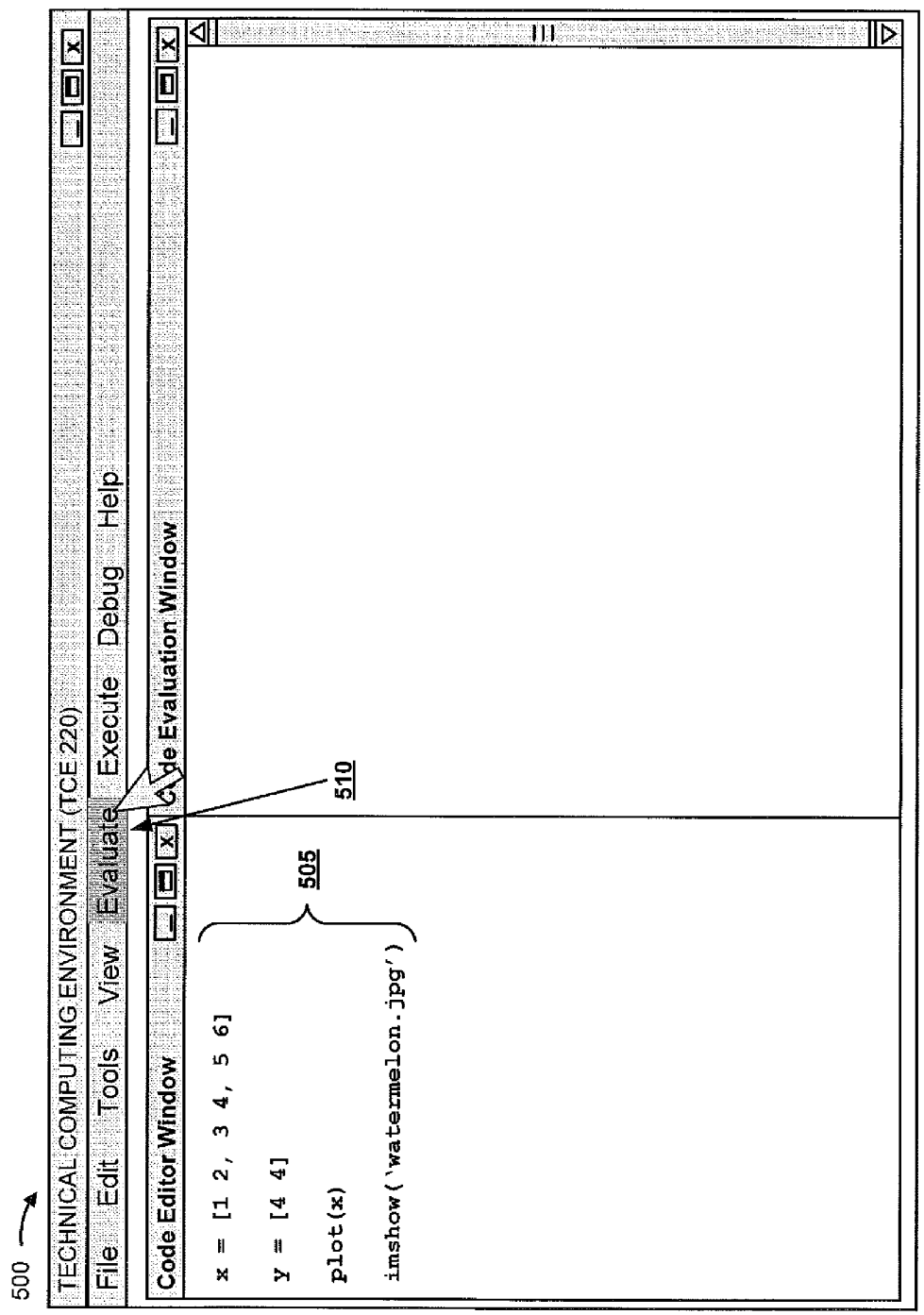
FIGS. 5A-5E are diagrams of an example implementation relating to the example process shown in FIG. 4.

As shown in FIG. 5A, and by reference number 505, assume that the user has input program code into a code editor window of TCE 220. For example, assume that the user has input the following code:

x=[1 2, 3 4, 5 6]
y=[4 4]
plot(x)
imshow('watermelon.jpg').

As further shown in FIG. 5A, the user may interact with TCE 220 to provide an indication, to client device 210, to evaluate the program code. For example, as shown by reference number 510, the user may interact with an "Evaluate" button and/or another input mechanism. Assume that user interaction with the "Evaluate" button causes client device 210 to evaluate the program code in the code editor window, and to provide corresponding program code evaluation results in the code evaluation window.

Figure 5B:
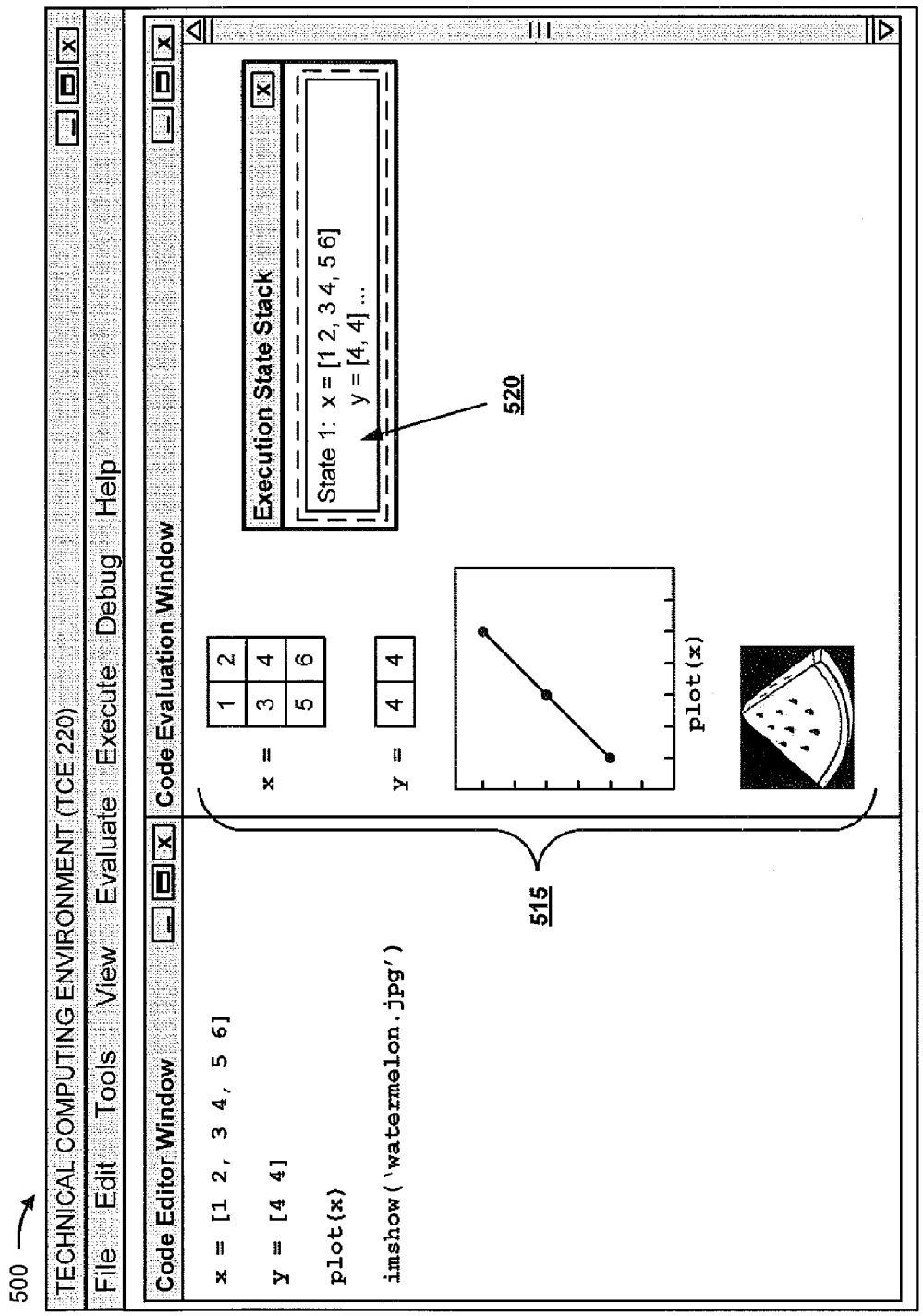

As shown in FIG. 5B, and by reference number 515, assume that client device 210 evaluates the first line of program code, x=[1 2, 3 4, 5 6], to generate a three by two array stored using the variable x, and provides a representation of the three by two array stored in x, as shown. Further, assume that client device 210 evaluates the second line of program code, y=[4 4], to generate a one by two array stored using the variable y, and provides a representation of the one by two array stored in y, as shown. Further, assume that client device 210 evaluates the third line of program code, plot(x), to generate a plot based on the three by two array stored in x, and provides a representation of the plot, as shown. Finally, assume that client device 210 evaluates the fourth line of program code, imshow('watermelon.jpg'), to load an image of a watermelon from memory, and provides the image, as shown. As shown by reference number 520, assume that client device 210 stores the execution state of the executed program code, identified as State 1. For example, the stored execution state may identify that execution of the program code caused a value of [1 2, 3 4, 5 6] to be stored in x, caused a value of [4 4] to be stored in y, caused x to be plotted on a figure, and caused an image identified as watermelon.jpg to be loaded from memory.

Figure 5C:
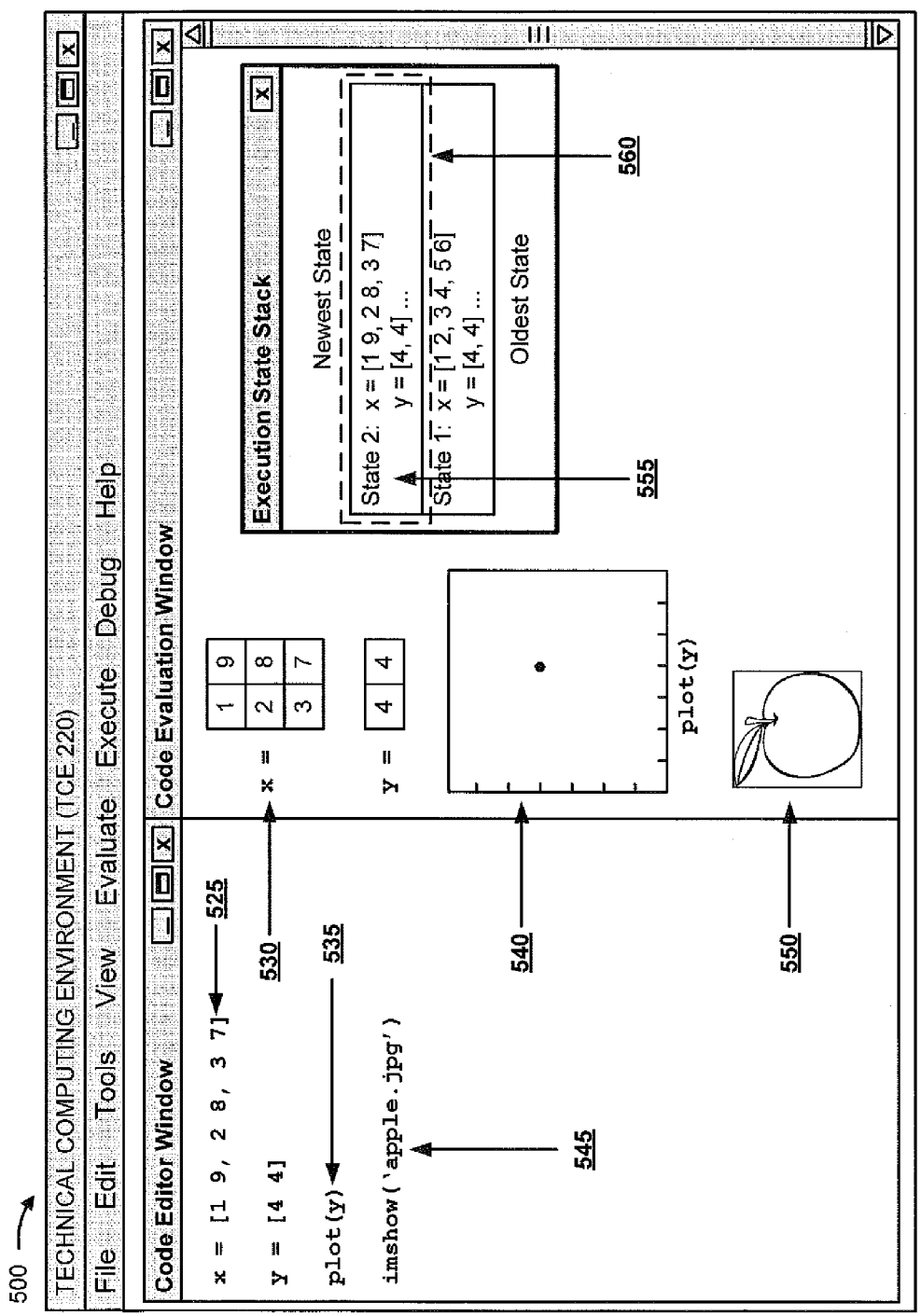

As shown in FIG. 5C, assume that the user modifies the program code. As shown by reference number 525, assume that the user modifies the first line of program code to x=[1 9, 2 8, 3 7]. Based on the modification, client device 210 executes the modified first line of program code to store the new array value in x, and provides a new evaluation result, as shown by reference number 530. As shown by reference number 535, assume that the user modifies the third line of program code to plot(y). Based on the modification, client device 210 executes the modified third line of program code to plot the value of y, and provides the plot, as shown by reference number 540. As shown by reference number 545, assume that the user modifies the fourth line of program code to imshow('apple.jpg'). Based on the modification, client device 210 executes the modified fourth line of program code to load an image of an apple from memory, and provides the image of the apple for display, as shown by reference number 550.

As shown by reference number 555, assume that client device 210 stores the execution state of the modified program code, identified as State 2. For example, the stored execution state may identify that execution of the program code caused a value of [1 9, 2 8, 3 7] to be stored in x, caused a value of [4 4] to be stored in y, caused y to be plotted on a figure, and caused an image identified as apple.jpg to be loaded from memory. As further shown by reference number 555, client device 210 stores the execution state in a stack, with the newest state (e.g., State 2) being stored at the top of the stack and the oldest state (e.g., State 1) being stored at the bottom of the stack. As shown by reference number 560, assume that client device 210 provides an active execution state indicator, shown as a box with a dashed line for a border, to indicate that State 2 is the active execution state. This may allow the user to see which execution state is active, and to select another execution state to be activated (e.g., restored).

Figure 5D:
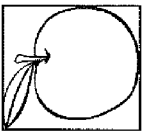
Figure 5E:
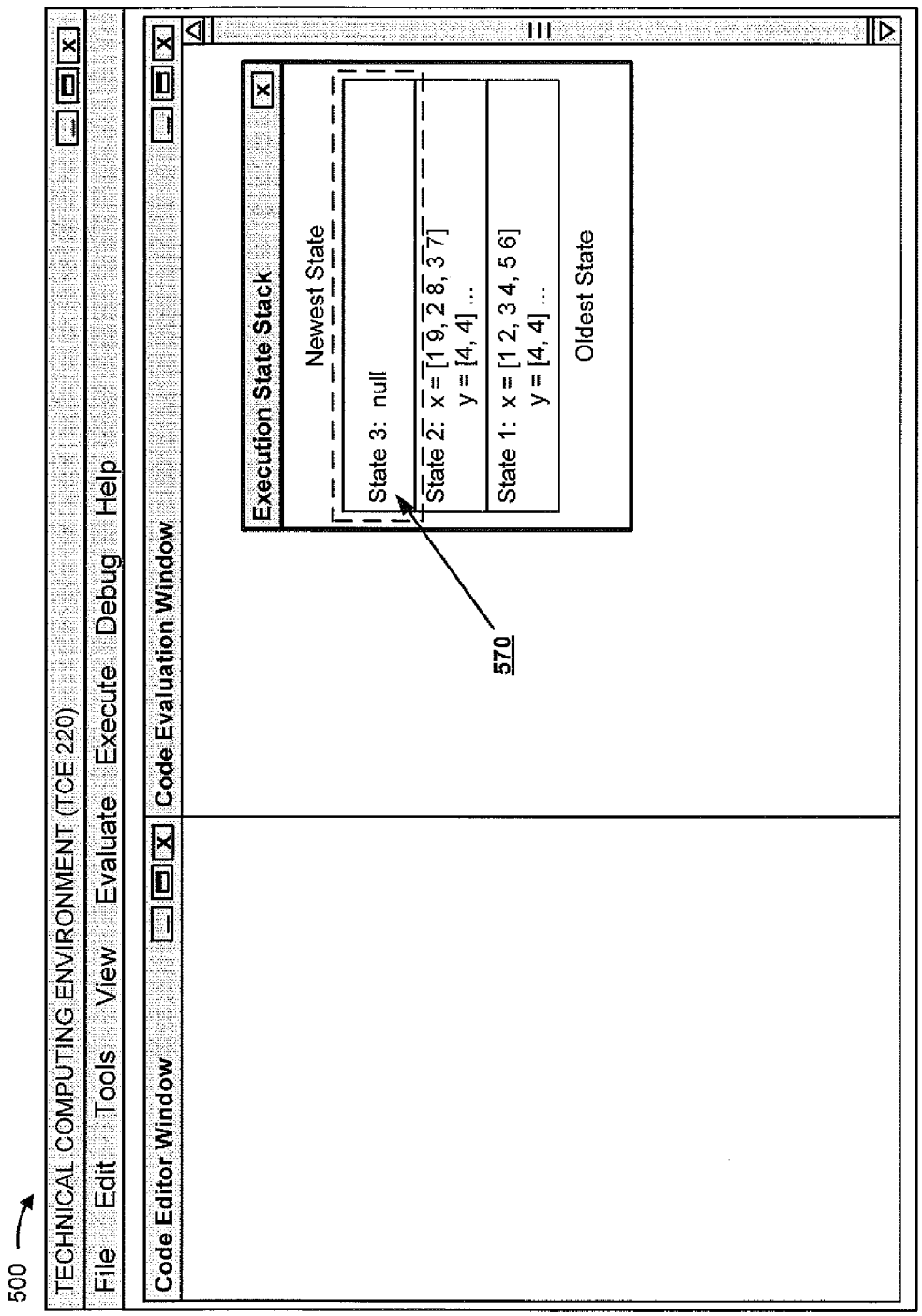

As shown in FIG. 5D, and by reference number 565, assume that the user inputs a new line of program code, shown as clear. As shown in FIG. 5E, assume that execution of the clear command causes client device 210 to delete all of the information in the workspace, including the program code and the evaluation results. As shown by reference number 570, assume that client device 210 stores the execution state after execution of the clear command, identified as State 3. For example, the stored execution state may identify that execution of the program code caused all values, figures, images, etc., to be deleted. As shown, client device 210 provides an active execution state indicator in association with State 3 to indicate that State 3 is the active execution state.

As indicated above, FIGS. 5A-5E are provided merely as an example. Other examples are possible and may differ from what was described with regard to FIGS. 5A-5E.

FIG. 6 is a flow chart of an example process 600 for undoing or redoing program code execution. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving an indication to undo or redo program code execution (block 610). For example, client device 210 may receive user input that causes client device 210 to undo or redo program code execution. For example, client device 210 may provide an interface (e.g., via TCE 220) that permits a user to indicate a desire to undo a program code execution (e.g., to undo a most recently stored execution state), to redo a program code execution (e.g., to redo a most recently undone execution state), or to select an execution state to be restored. The user may provide the indication via an input mechanism, such as a button, a menu item, a keyboard command, etc.

In some implementations, client device 210 may (e.g., based on user input) provide an interface that permits the user to select an execution state to be restored. Client device 210 may provide information that identifies an execution state (e.g., a name of the execution state, program code associated with the execution state, values associated with the execution state, results associated with the execution state, etc.), may provide an indication of a temporal order of the execution states (e.g., by providing a stack that indicates an order of the execution states), may provide an indication of a date and/or time that an execution state was generated and/or stored, etc. Client device 210 may receive user input that identifies an execution state, provided via the interface, to be restored.

As further shown in FIG. 6, process 600 may include selecting a stored execution state to be restored based on receiving the indication (block 620). For example, client device 210 may determine, based on user input, a stored execution state to be restored. Client device 210 may determine the stored execution state based on an active execution state. For example, if the user selects an undo operation, then client device 210 may restore an execution state that is next-oldest (e.g., in temporal order) relative to the active execution state. As another example, if the user selects a redo operation, then client device 210 may restore an execution state that is next-newest (e.g., in temporal order) relative to the active execution state. Additionally, or alternatively, the user may select an execution state from a set of execution states, and client device 210 may restore the selected execution state.

As further shown in FIG. 6, process 600 may include restoring the selected execution state (block 630). For example, client device 210 may restore the selected execution state by restoring a programming environment to the selected execution state.

Client device 210 may restore an execution state by restoring one or more variable values, in some implementations. For example, client device 210 may determine a value of a variable in a selected execution state, and may restore the execution state by associating the value with the variable in the programming environment. Additionally, or alternatively, client device 210 may undo or redo the storing of a value in a variable, and may restore a different value to the variable. Similarly, client device 210 may restore one or more figures by re-generating a figure, loading a stored figure (e.g., associated with a selected execution state), replacing a figure with a different figure, etc. Similarly, client device 210 may restore one or more results by re-generating a result, loading a stored result (e.g., associated with a selected execution state) from memory, replacing a result with a different result, etc.

Client device 210 may restore an execution state by restoring a file system state, in some implementations. For example, if an execution causes a file to be deleted, client device 210 may undo the execution by restoring the file (e.g., by re-creating or loading the file). As another example, if an execution causes a file to be created, client device 210 may undo the execution by deleting the file. As another example, if an execution causes a file to be modified, client device 210 may undo the execution by undoing the modification (e.g., by restoring the file to a previously-stored state).

In some implementations, client device 210 may obtain the execution state to be restored from a server device 230 that stores the execution state. Different execution states may be stored by different devices (e.g., different server device 230, a client device 210 and a server device 230, etc.), in some implementations. For example, a first computation may be performed by a first server device 230, and the first server device 230 may save a first execution state associated with the first computation. Further, a second computation may be performed by a second server device 230, and the second server device 230 may save a second execution state associated with the second computation. Client device 210 may request the first execution state from the first server device 230 and/or may request the second execution state from the second server device 230 (e.g., based on user selection of an execution state to be restored, based on an execution state to be provided via a user interface, etc.).

As further shown in FIG. 6, process 600 may include providing program code associated with the selected execution state (block 640). For example, client device 210 may provide (e.g., via the code editor portion of the user interface) program code associated with the selected execution state, such as the program code used to generate the selected execution state. For example, assume that first program code is executed to generate a first execution state, and second program code is executed to generate a second execution state. In this case, when restoring the first execution state from the second execution state, client device 210 may replace the second program code with the first program code (e.g., in the code editor window).

In some implementations, client device 210 may provide a difference indicator that indicates provided program code that has changed due to the change in execution state. For example, the difference indicator may indicate the difference by highlighting changed program code, outlining changed program code, providing changed program code via a separate window, or otherwise marking the changed program code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show examples of restoring an execution state using an undo operation, a redo operation, and a selection of a stored execution state.

Figure 7A:
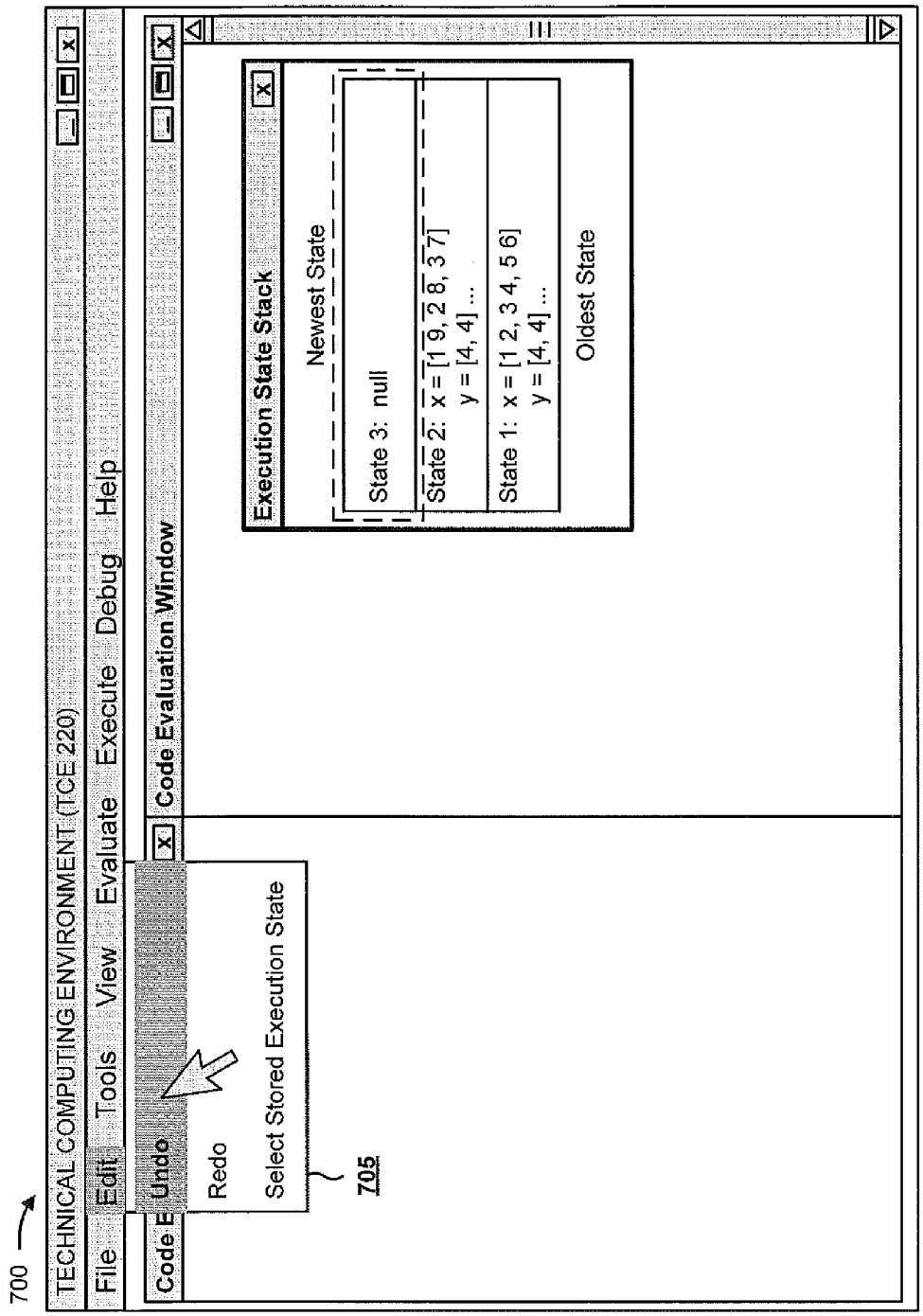
FIGS. 7A-7F are diagrams of an example implementation relating to the example process shown in FIG. 6.

For the purposes of FIGS. 7A-7F, assume that the user has input the information shown in FIGS. 5A-5E, and that client device 210 has performed the operations shown in FIGS. 5A-5E. Thus, as shown in FIG. 7A, client device 210 has stored three execution states, with the active state being State 3, which is a null state based on execution of a clear command. As shown by reference number 705, assume that the user selects to undo a most recent program code execution (e.g., execution of the clear command).

Figure 7B:
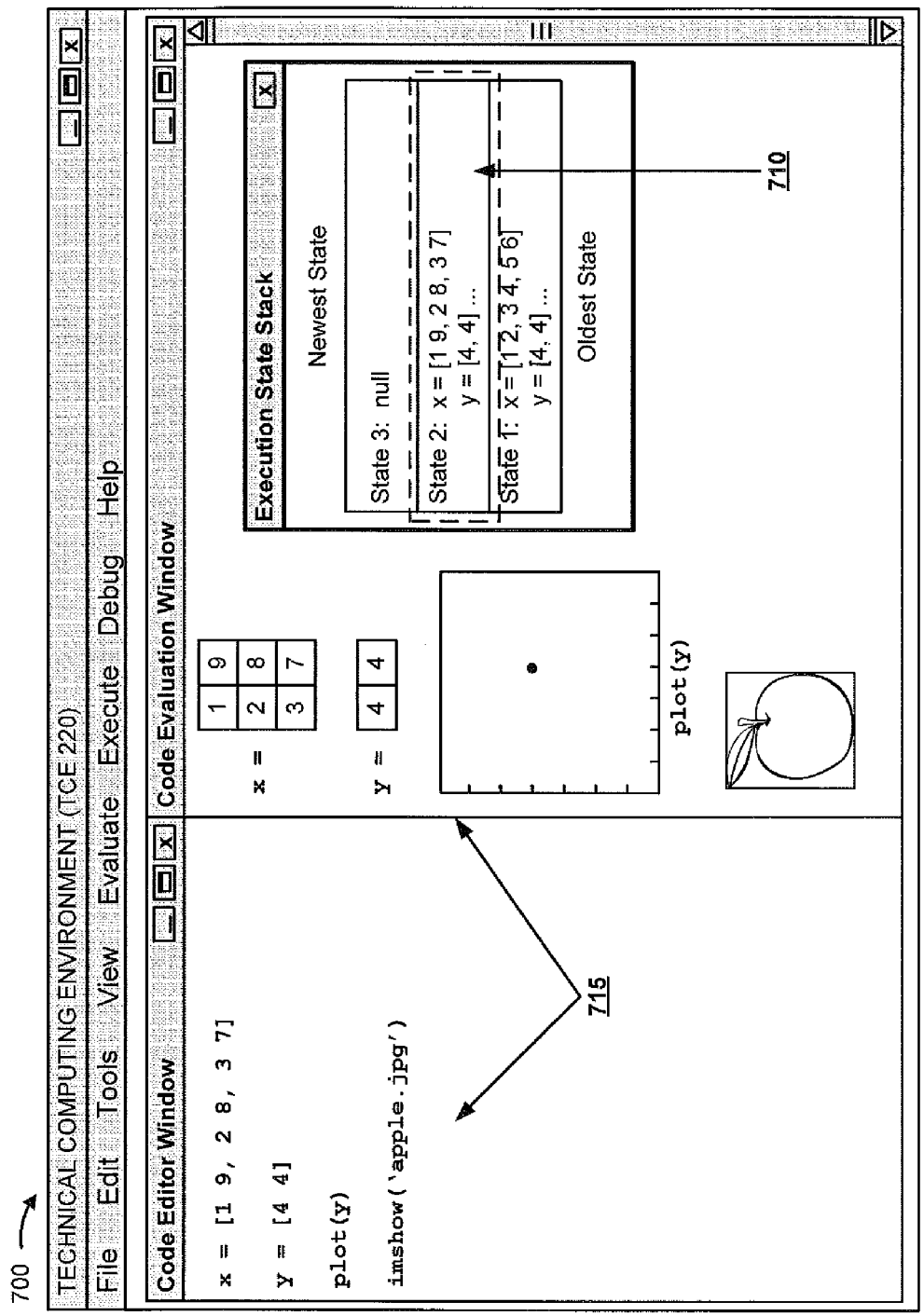

As shown in FIG. 7B, based on receiving the indication to undo the most recent program code execution, client device 210 restores State 2. As shown by reference number 710, client device 210 provides an indication that State 2 is the active state. As shown by reference number 715, client device 210 restores the program code and the results associated with State 2. For example, client device 210 may undo the clear operation by restoring the values of x and y associated with State 2 (e.g., [1 9, 2 8, 3 7] and [4 4]), by restoring the figure that plots y, and by loading the image of the apple from the file apple.jpg.

Figure 7C:
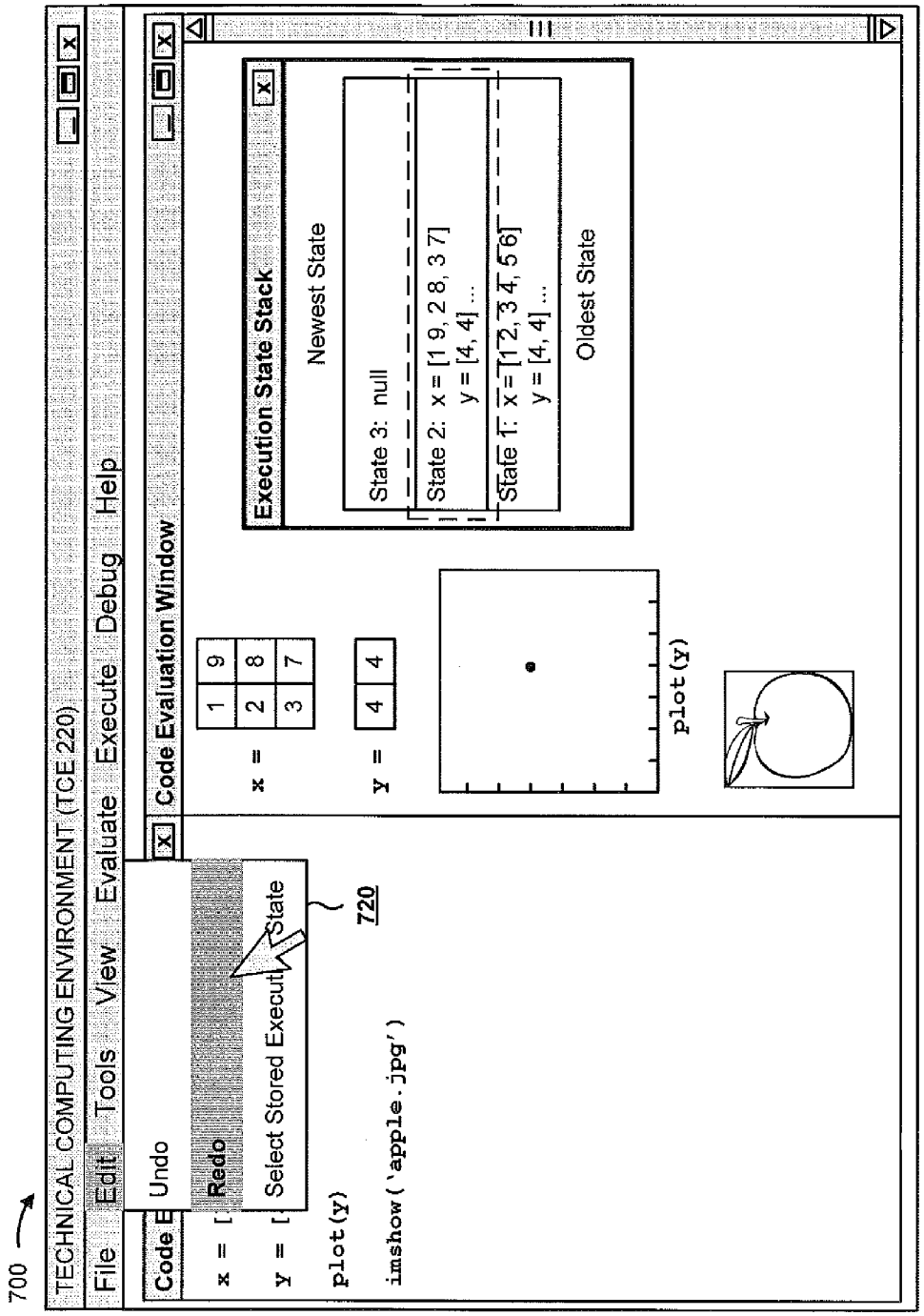
Figure 7D:
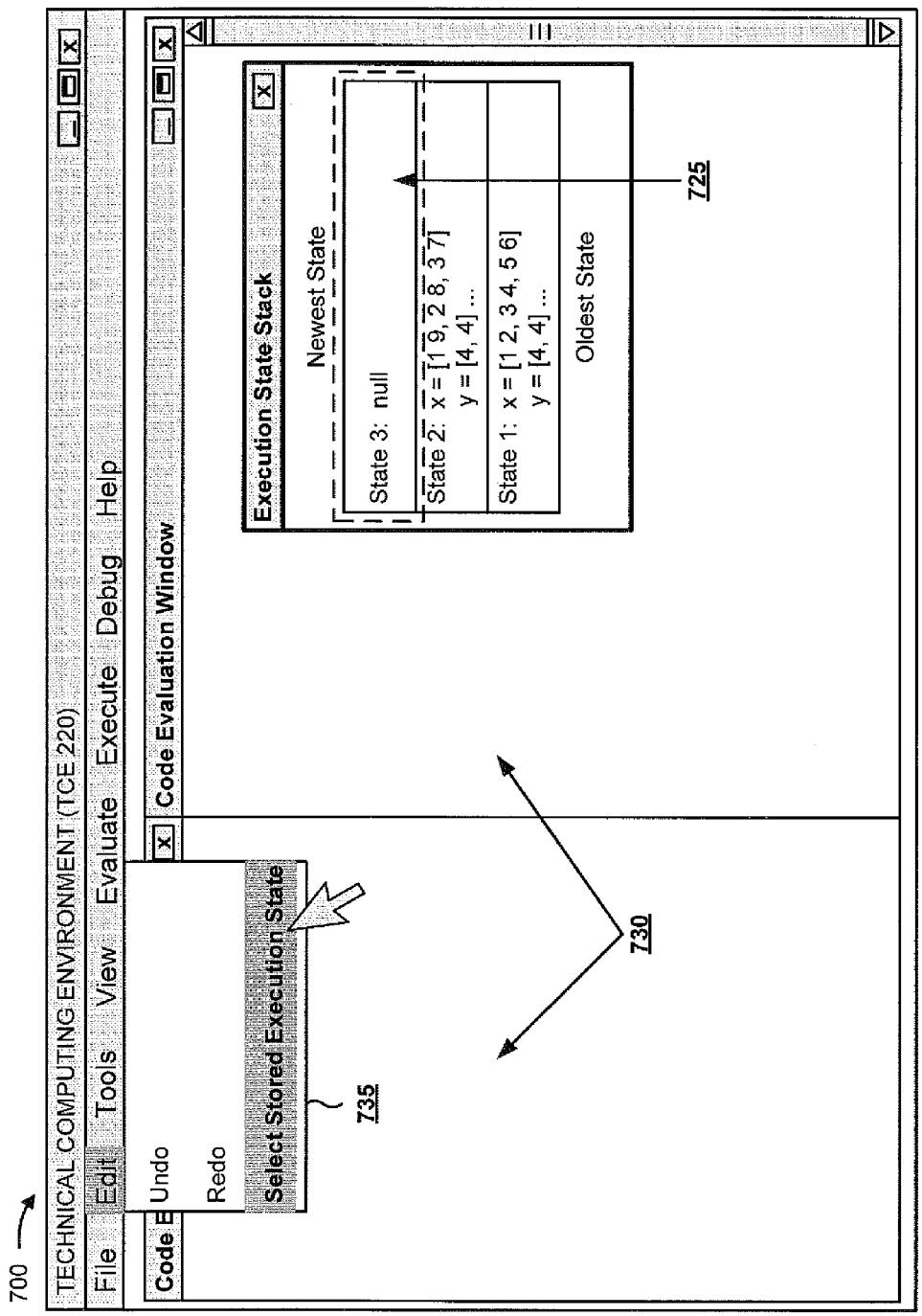

As shown in FIG. 7C, and by reference number 720, assume that the user selects to redo an undone program code execution (e.g., execution of the clear command). As shown in FIG. 7D, based on receiving the indication to redo the undone program code execution, client device 210 restores State 3 (e.g., by re-executing the clear command and/or by deleting the variable values of x and y from the programming workspace, by deleting the plot(y) figure from the programming workspace, and by deleting the image from the programming workspace). As shown by reference number 725, client device 210 provides an indication that State 3 is the active state. As shown by reference number 730, client device 210 restores the program code and the results associated with State 3. In this case, client device 210 does not display any program code or results because execution of the clear command causes the program code and the results to be cleared.

Figure 7E:
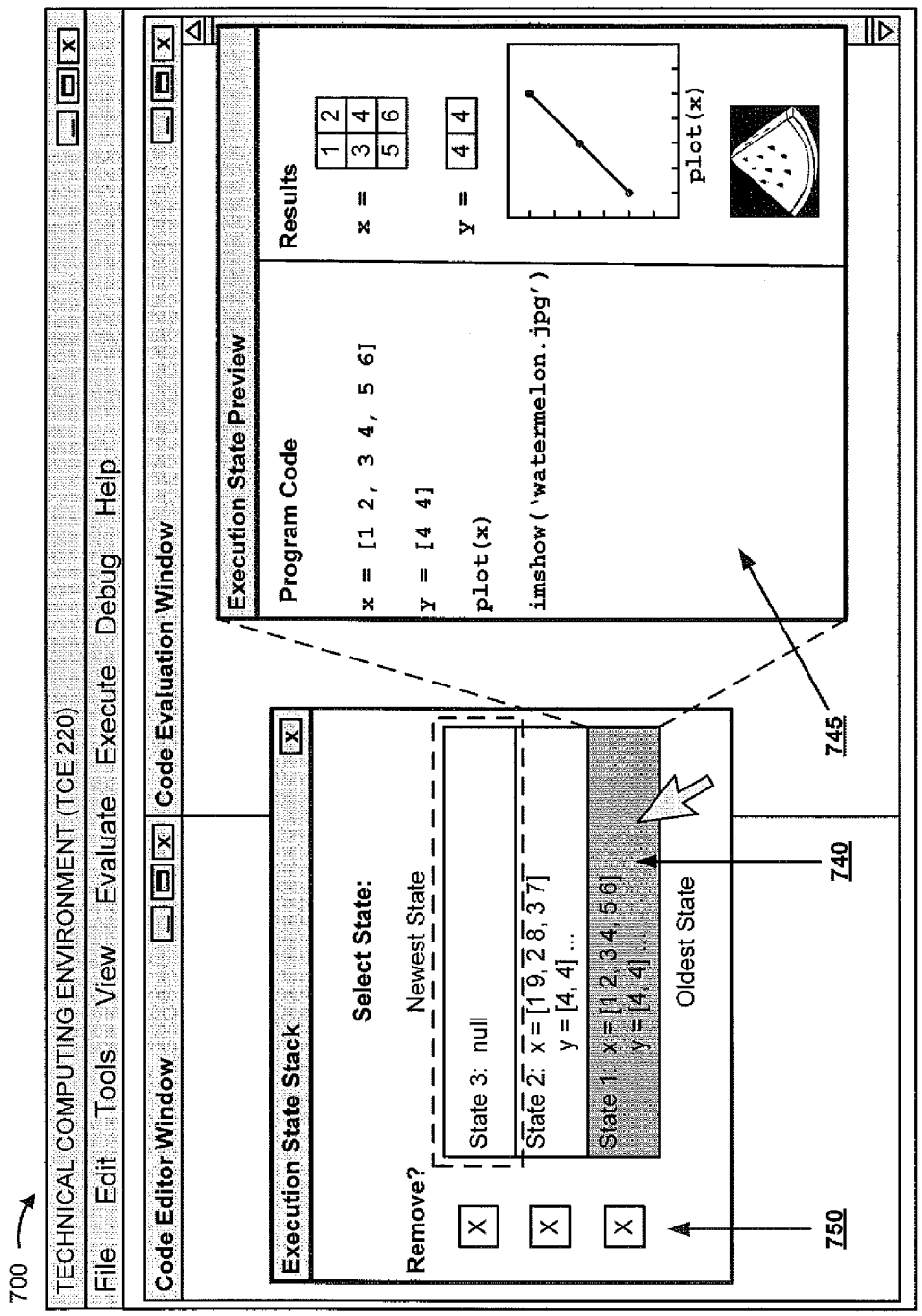

As shown by reference number 735, assume that the user provides an indication to select an execution state to be restored. As shown in FIG. 7E, and by reference number 740, assume that the user hovers over information that identifies State 1. Based on the interaction, client device 210 provides a pop-up window for display, shown as "Execution State Preview." As shown by reference number 745, the pop-window may provide execution state information associated with State 1, such as program code used to generate State 1, results that are included in State 1, etc. As shown by reference number 750, client device 210 may also provide an input mechanism for a user to remove a state from the execution state stack and/or to delete an execution state. Additionally, or alternatively, a user may also re-order the execution states (e.g., using drag and drop). As shown in FIG. 7E, assume that the user selects to restore State 1.

Figure 7F:
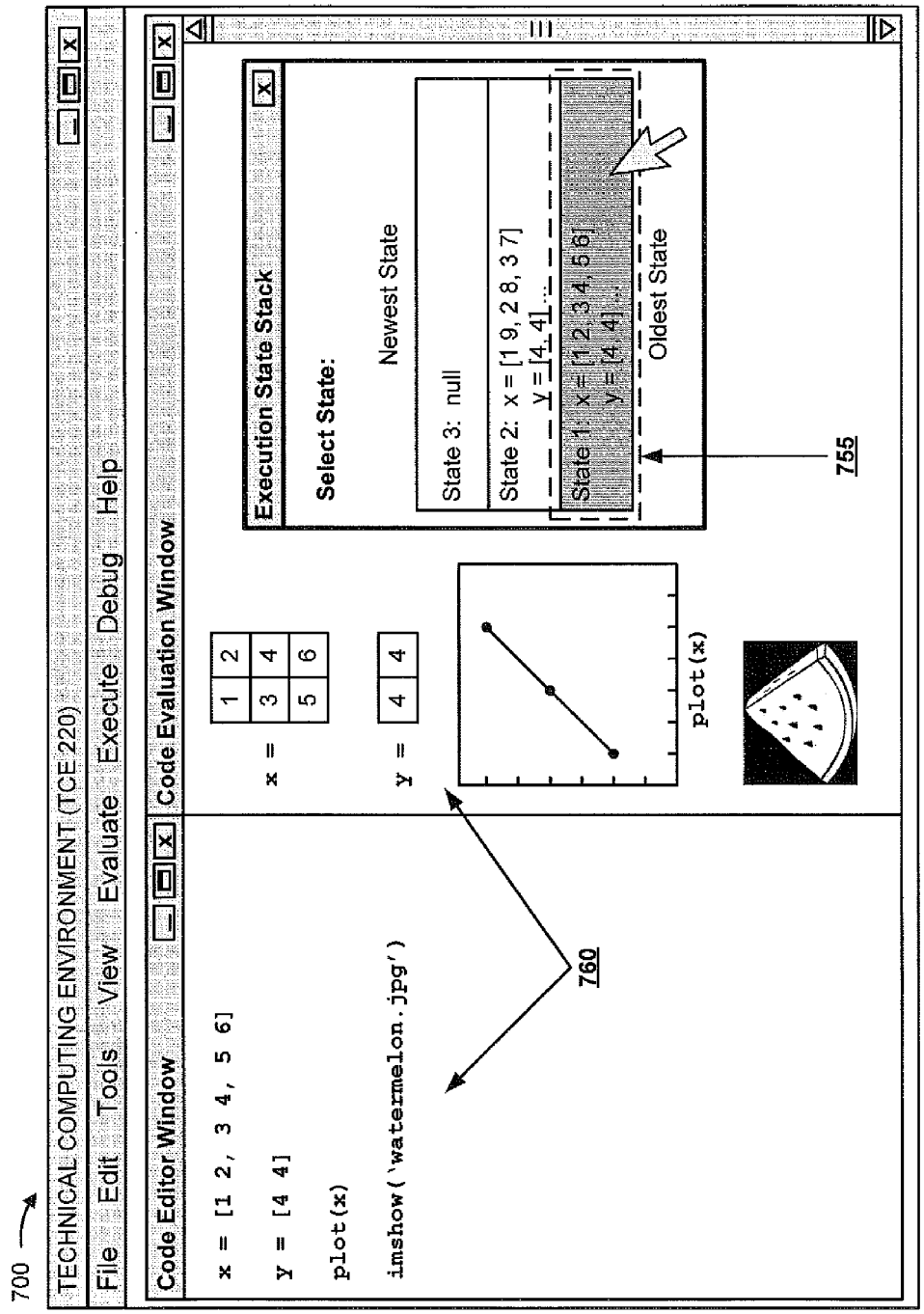

As shown in FIG. 7F, based on receiving the indication to restore State 1, client device 210 restores State 1. As shown by reference number 755, client device 210 provides an indication that State 1 is the active state. As shown by reference number 760, client device 210 restores the program code and the results associated with State 1. For example, client device 210 may restore State 1 by restoring the values of x and y associated with State 1 (e.g., [1 2, 3 4, 5 6] and [4 4]), by restoring the figure that plots x, and by loading the image of the watermelon from the file watermelon.jpg.

As indicated above, FIGS. 7A-7F are provided merely as an example. Other examples are possible and may differ from what was described with regard to FIGS. 7A-7F.

FIGS. 8A-8D are diagrams of an example implementation 800 relating to example process 400 shown in FIG. 4 and example process 600 shown in FIG. 6. FIGS. 8A-8D show an example of a stack that may be used to store execution states.

Figure 8A:
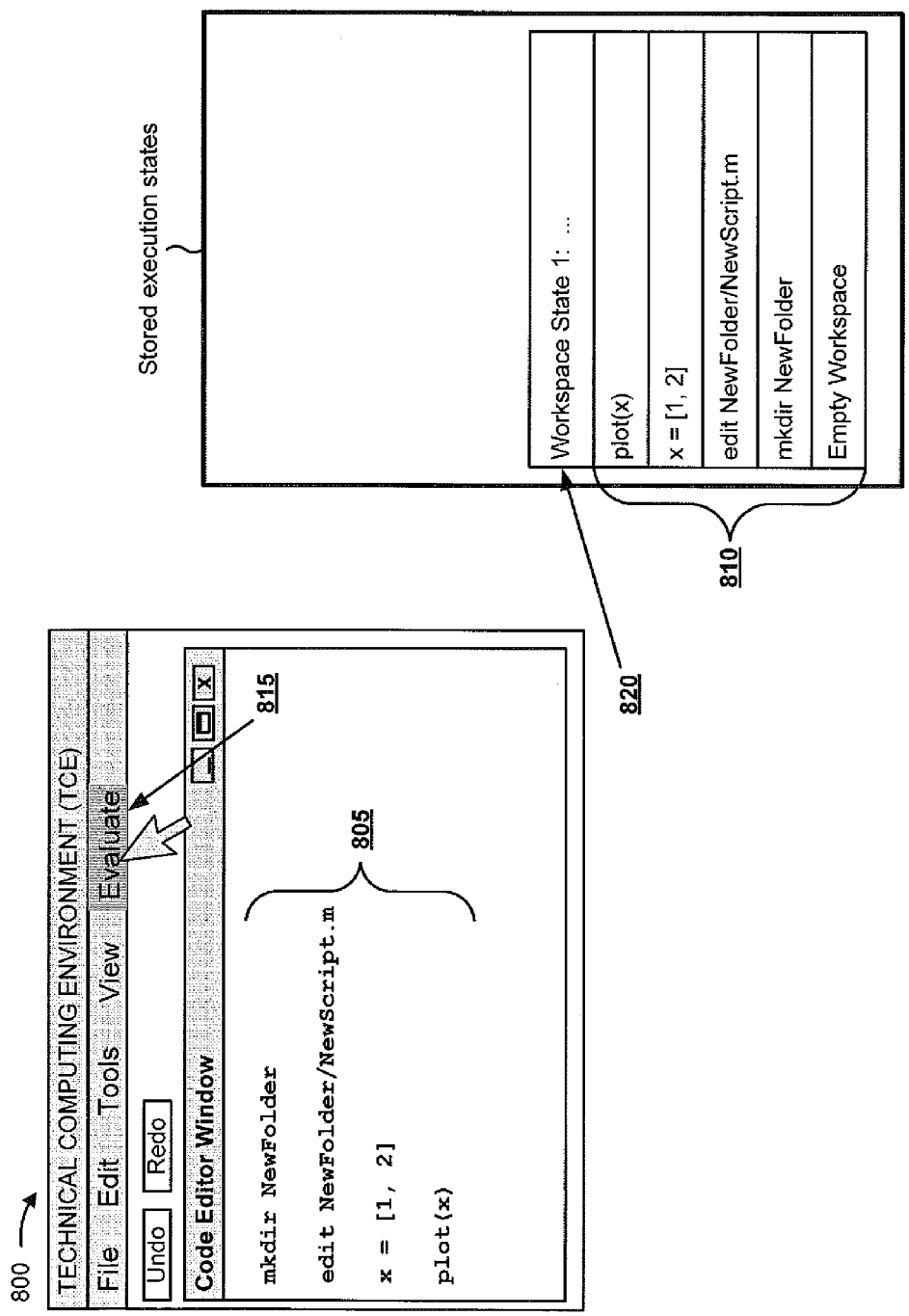
FIGS. 8A-8D are diagrams of an example implementation relating to the example process shown in FIG. 4 and FIG. 6.

As shown in FIG. 8A, and by reference number 805, assume that the user has input program code into a code editor window of TCE 220. For example, assume that the user has input the following code:

mkdir NewFolder
edit NewFolder/NewScript.m
x=[1, 2]
plot(x).

Assume that as the user inputs the above program code, client device 210 stores an execution state, associated with each line of code, in a stack. For example, as shown by reference number 810, an initial execution state at the bottom of the stack may indicate an empty workspace. As the user types the program code, client device 210 adds an execution state (e.g., an indication of an operation performed by executing the program code) to the stack.

As shown by reference number 815, the user may interact with an "Evaluate" button and/or another input mechanism.

Assume that user interaction with the "Evaluate" button causes client device 210 to evaluate the program code. Further, as shown by reference number 820, assume that evaluation of the program code causes client device 210 to store an execution state, generated based on the evaluation, in the stack. In this way, client device 210 may store bulk changes to the program code (e.g., changes that occur between instances where a user clicks the "Evaluate" button) and may store individual changes to the program code (e.g., adding, deleting, or editing a line of code in between bulk evaluations). This may permit a user to undo large changes to the program code and/or execution state as well as smaller changes to the program code and/or execution state.

Figure 8B:
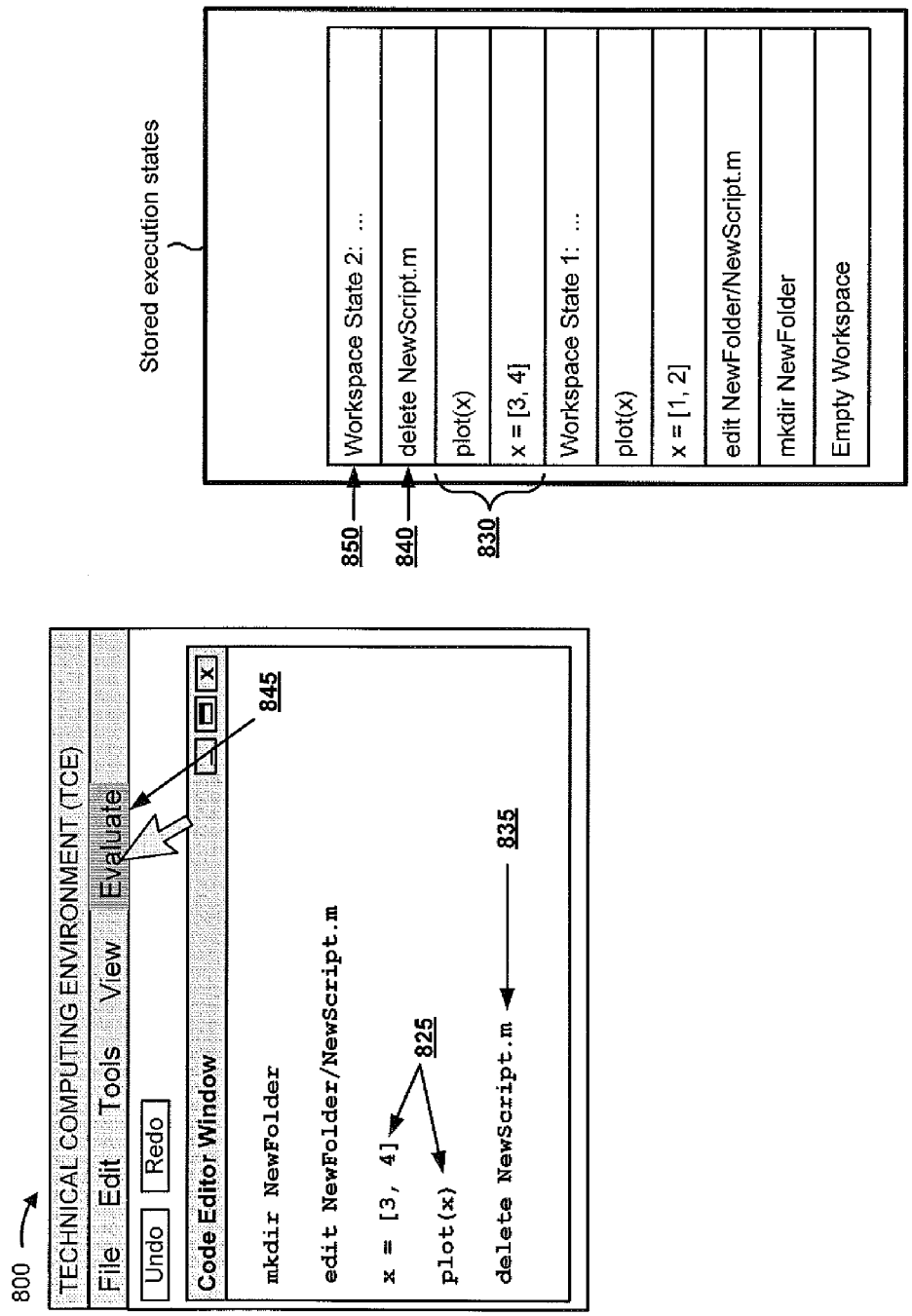

As shown in FIG. 8B, assume that the user modifies the program code provided in the code editor window. As shown by reference number 825, assume that the user modifies the third line of program code to x=[3, 4], which impacts the fourth line of program code, plot(x). Assume that as the user inputs the above program code, client device 210 stores an execution state, associated with each line of code, in a stack. For example, as shown by reference number 830, as the user types the program code, client device 210 adds an execution state (e.g., an indication of an operation performed by executing the program code) to the stack.

Similarly, assume that the user inputs a new line of program code, delete NewScript.m, as shown by reference number 835. As shown by reference number 840, when the user finishes inputting the new line of program code, client device 210 adds an execution state, for the new line of program code, to the stack.

As shown by reference number 845, assume that the user interacts with the "Evaluate" button. Assume that user interaction with the "Evaluate" button causes client device 210 to evaluate the program code. Further, as shown by reference number 850, assume that evaluation of the program code causes client device 210 to store an execution state, generated based on the evaluation, in the stack. In this way, the user may switch between a most recent execution (e.g., Workspace State 2) and an older execution (e.g., Workspace State 1). Additionally, or alternatively, the user may step backward through edits made in between each bulk execution (e.g., adding a line of code, deleting a line of code, editing a line of code, etc.).

Figure 8C:
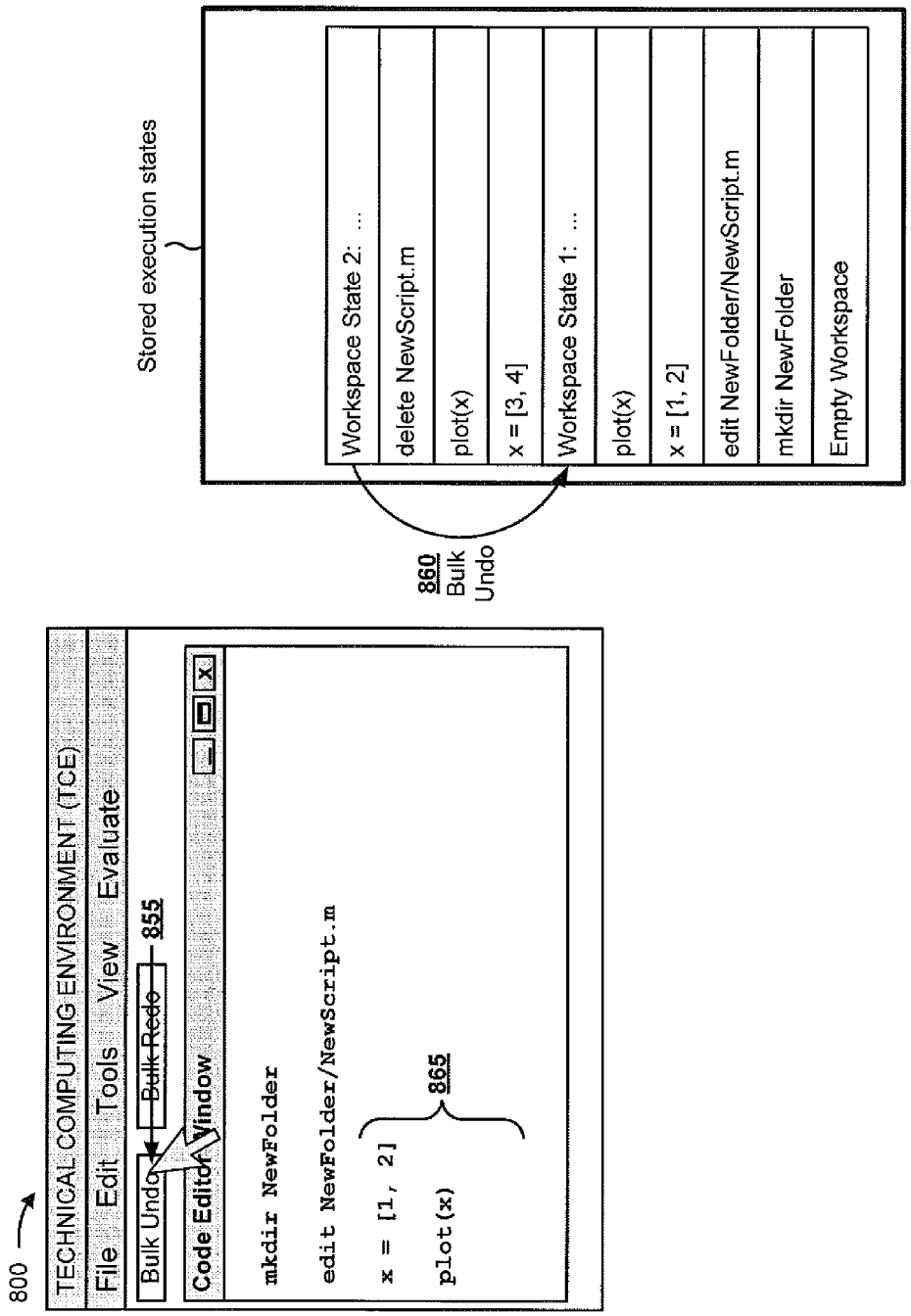

FIG. 8C shows an example of a bulk undo operation. As shown in FIG. 8C, and by reference number 855, assume that the user interacts with a bulk undo button to undo a most recent execution, and to restore Workspace State 1 (e.g., from an active execution state of Workspace State 2). As shown by reference number 860, based on the user interaction, client device 210 determines a next-oldest bulk execution state in the stack, which is Workspace State 1. Client device 210 restores Workspace State 1, which undoes the deletion of the NewScript.m file, restores the value of x to [1, 2], and restores the figure associated with plot(x) based on the restored value of x. As shown by reference number 865, client device 210 also provides the program code associated with Workspace State 1.

Figure 8D:
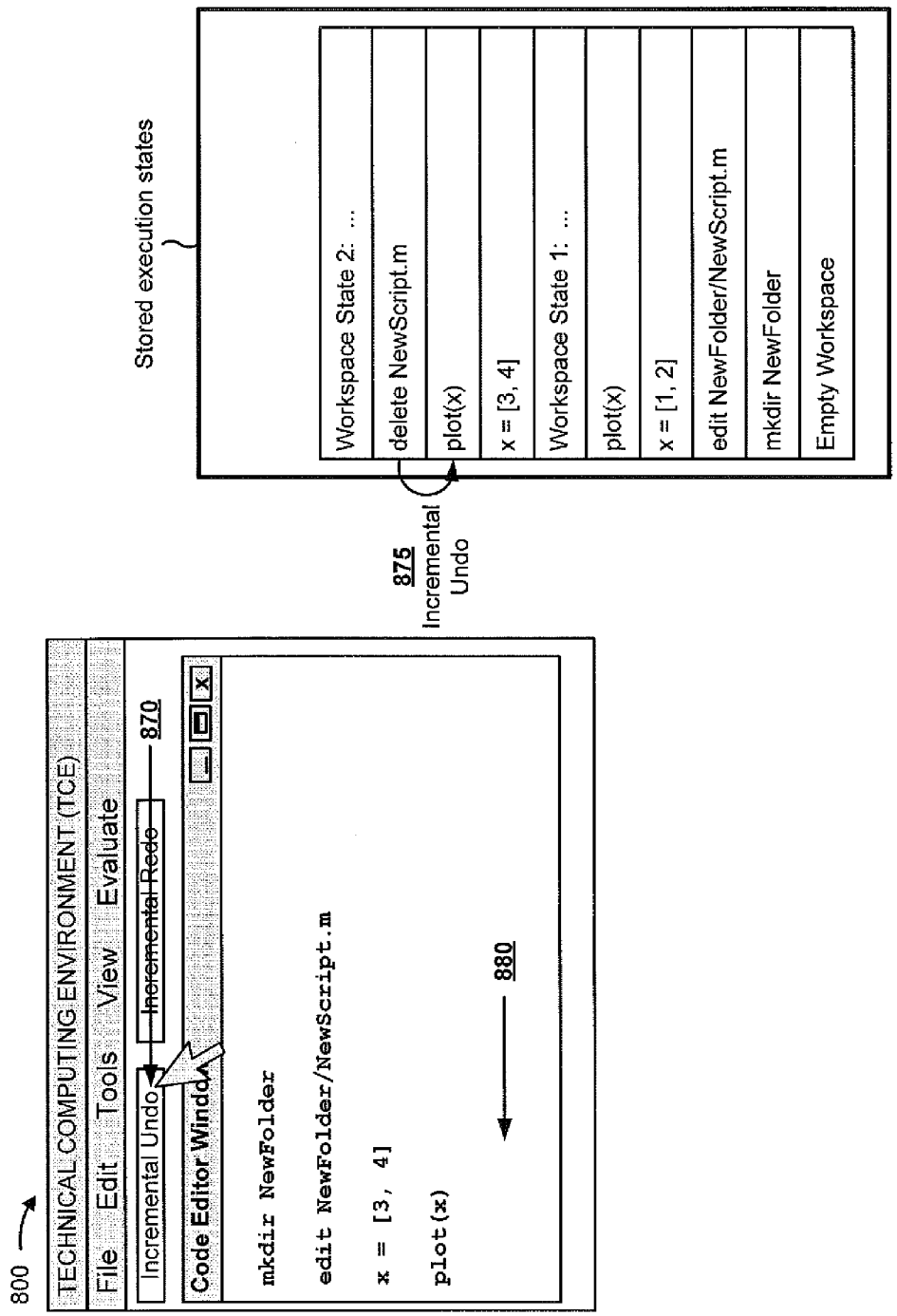

FIG. 8D shows an example of an incremental undo operation, as opposed to the bulk undo operation shown in FIG. 8C. As shown in FIG. 8D, and by reference number 870, assume that the user interacts with an incremental undo button to undo a most recent edit to the program code. As shown by reference number 875, based on the user interaction, client device 210 determines a most-recent edit in the stack, which is the addition of the delete NewScript.m line of program code. As shown by reference number 880, client device 210 removes this line of program code from the code editor window. Additionally, or alternatively, if client device 210 has executed this line of program code (e.g., in a live evaluation programming environment) to delete the file NewScript.m, then client device 210 may undo the deletion of the NewScript.m file.

As indicated above, FIGS. 8A-8D are provided merely as an example. Other examples are possible and may differ from what was described with regard to FIGS. 8A-8D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, VERILOG® code, JAVA® code, another type of hardware and/or software based code that may be compiled and/or synthesized, etc.), binary code that may be executed (e.g., executable files that may be directly executed by an operating system, bitstream files that may be used to configure an FPGA, JAVA® byte code, object files combined together with linker directives, source code, makefiles, etc.), text files that may be executed in conjunction with other executables (e.g., PYTHON® text files, OCTAVE® files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), etc.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
obtain first program code;
cause the first program code to be executed;
determine a first execution state based on causing the first program code to be executed,
the first execution state identifying a first set of results of executing the first program code;
store the first execution state;
obtain second program code that includes a modification to the first program code;
cause the second program code to be executed;
determine a second execution state based on causing the second program code to be executed,
the second execution state identifying a second set of results of executing the second program code and a temporal relationship between the first execution state and the second execution state;
store the second execution state;
receive an indication to restore the first execution state; and
restore the first execution state, based on receiving the indication and based on the temporal relationship, to cause the first program code, associated with the first execution state, to be provided.

2. The device of claim 1, where the one or more processors, when restoring the first execution state, are further to:
determine an operation performed based on causing the second program code to be executed; and
undo the operation.

3. The device of claim 2, where the one or more processors are further to:
receive an indication to restore the second execution state; and
redo the operation based on receiving the indication to restore the second execution state.

4. The device of claim 1, where the first execution state identifies a first value for a variable and the second execution state identifies a second value for the variable; and
where the one or more processors, when restoring the first execution state, are further to:
replace the second value, stored in a memory location associated with the variable, with the first value.

5. The device of claim 1, where the first execution state identifies a first state of a file system and the second execution state identifies a second state of the file system; and
where the one or more processors, when restoring the first execution state, are further to:
restore the file system from the second state to the first state.

6. The device of claim 1, where the one or more processors, when receiving the indication to restore the first execution state, are further to:
provide, via a user interface, information that identifies the first execution state and information that identifies the second execution state;
receive, via a user interaction with the user interface, a selection of the first execution state; and
receive the indication to restore the first execution state based on receiving the selection of the first execution state.

7. The device of claim 1, where the second execution state identifies one or more differences between the first set of results and the second set of results; and
where the one or more processors, when restoring the first execution state, are further to:
restore the first execution state based on the one or more differences.

8. A computer-readable medium storing instructions, the instructions comprising:
one or more instructions that, when executed by one or more processors, cause the one or more processors to:
obtain first program code;
cause the first program code to be executed;
determine a first set of results based on causing the first program code to be executed;
store the first set of results;
obtain second program code that includes a modification to the first program code;
cause the second program code to be executed;
determine a second set of results based on causing the second program code to be executed;
store the second set of results and an indication of a temporal relationship between the first set of results and the second set of results;
receive an indication to restore the first set of results; and
restore the first set of results, based on receiving the indication and based on the temporal relationship, to cause the first program code, associated with the first set of results, to be provided.

9. The computer-readable medium of claim 8, where the first set of results includes a first value for a variable and the second set of results includes a second value for the variable; and
where the one or more instructions, that cause the one or more processors to restore the first set of results, further cause the one or more processors to:
replace the second value, stored in a memory location associated with the variable, with the first value.

10. The computer-readable medium of claim 8, where the first set of results identifies a first state of a file system and the second set of results identifies a second state of the file system; and
where the one or more instructions, that cause the one or more processors to restore the first set of results, further cause the one or more processors to:
restore the file system from the second state to the first state.

11. The computer-readable medium of claim 8, where the one or more instructions, that cause the one or more processors to receive the indication to restore the first set of results, further cause the one or more processors to:
provide, via a user interface, information that identifies the first set of results and information that identifies the second set of results;
receive, via a user interaction with the user interface, a selection of the first set of results; and
receive the indication to restore the first set of results based on receiving the selection of the first set of results.

12. The computer-readable medium of claim 8, where the one or more instructions, when executed by the one or more processors, further cause the one or more processors to:

receive an indication to delete the first set of results or the second set of results; and delete the first set of results or the second set of results based on receiving the indication to delete the first set of results or the second set of results.

13. The computer-readable medium of claim 8, where the one or more instructions, when executed by the one or more processors, further cause the one or more processors to:

receive an indication to re-order the first set of results and the second set of results; and modify the temporal relationship between the first set of results and the second set of results based on receiving the indication to re-order the first set of results and the second set of results.

14. The computer-readable medium of claim 8, where the second set of results identifies one or more differences between the first set of results and the second set of results; and where the one or more instructions, that cause the one or more processors to restore the first set of results, further cause the one or more processors to:

restore the first set of results based on the one or more differences.

15. A method, comprising:

obtaining first program code,
the obtaining the first program code being performed by one or more devices;

causing the first program code to be executed,
the causing the first program code to be executed being performed by the one or more devices;

determining a first execution state generated based on causing the first program code to be executed,
the determining the first execution state being performed by the one or more devices;

storing first information that identifies the first execution state,
the storing the first information being performed by the one or more devices;

obtaining second program code that is different from the first program code,
the obtaining the second program code being performed by the one or more devices;

causing the second program code to be executed,
the causing the second program code to be executed being performed by the one or more devices;

determining a second execution state generated based on causing the second program code to be executed,
the determining the second execution state being performed by the one or more devices;

storing second information that identifies the second execution state,
the storing the second information being performed by the one or more devices;

receiving an indication to restore the first execution state,
the receiving the indication being performed by the one or more devices; and restoring the first execution state based on receiving the indication,
restoring the first execution state causing the first program code, associated with the first execution state, to be provided;
the restoring the first execution state being performed by the one or more devices.

16. The method of claim 15, further comprising:

providing, via a user interface, information that identifies the first execution state and information that identifies the second execution state;

receiving, via a user interaction with the user interface, a selection of the first execution state or the second execution state; and providing execution state information associated with the selected execution state,
the execution state information including at least one of:
program code used to generate the selected execution state, or
a program code evaluation result associated with the selected execution state.

17. The method of claim 15, further comprising:

providing, via a user interface, information that identifies the first execution state and information that identifies the second execution state;

receiving, via a user interaction with the user interface, a selection of the first execution state or the second execution state;

receiving an indication to delete the selected execution state; and deleting the selected execution state based on receiving the indication to delete the selected execution state.

18. The method of claim 15, where the first execution state identifies a first value for a variable and the second execution state identifies a second value for the variable; and where restoring the first execution state further comprises:
replacing the second value, stored in a memory location associated with the variable, with the first value.

19. The method of claim 15, where the first execution state identifies a first state of a file system and the second execution state identifies a second state of the file system; and where restoring the first execution state further comprises:
restoring the file system from the second state to the first state.

20. The method of claim 15, where receiving the indication to restore the first execution state further comprises:

providing, via a user interface, information that identifies the first execution state and information that identifies the second execution state;

receiving, via a user interaction with the user interface, a selection of the first execution state; and receiving the indication to restore the first execution state based on receiving the selection of the first execution state.

* * * * *